United States Patent [19]

Brezzo et al.

[11] Patent Number: 4,493,051
[45] Date of Patent: Jan. 8, 1985

[54] COMMUNICATION LINE SCANNING DEVICE FOR A COMMUNICATION CONTROLLER

[75] Inventors: Bernard Brezzo, Nice; Jean Calvignac, LaGaude; Richard Dambricourt, Cagnes; Andre Masclet; Jean-Pierre Sanche, both of Antibes, all of France

[73] Assignee: International Business Machines Corp., Armonk, N.Y.

[21] Appl. No.: 433,609

[22] Filed: Oct. 12, 1982

[30] Foreign Application Priority Data

Oct. 28, 1981 [EP] European Pat. Off. ........ 81430037.2

[51] Int. Cl.³ .............................................. G06F 3/04
[52] U.S. Cl. .................................................. 364/900
[58] Field of Search ... 364/200 MS File, 900 MS File

[56] References Cited

U.S. PATENT DOCUMENTS

| 4,156,796 | 5/1979 | O'Neal et al. | 364/900 |
| 4,188,665 | 2/1980 | Nagel et al. | 364/200 |
| 4,291,375 | 9/1981 | Wolf et al. | 364/483 |
| 4,333,153 | 6/1982 | Mietzko et al. | 364/523 |
| 4,371,928 | 2/1983 | Barlow et al. | 364/200 |

*Primary Examiner*—Harvey E. Springborn
*Attorney, Agent, or Firm*—John B. Frisone

[57] ABSTRACT

A line scanning device which operates under the control of a microprocessor connected to a control memory in which a memory location area is assigned to each line is provided for a line adapter in a communication controller for receiving or sending message bits in series from or to terminals connected to the lines using any protocols. It comprises a first store which includes a first and a second memories, an area being assigned to each line in each of the memories which can be read and written in the same time and a second store which includes a single memory in which a storage location area is assigned to each line. These stores are addressed by a control and address unit which includes first and second address counters under the control of an elementary time counter, the first counter outputting the address information relating to the first store during time t provided for scanning a line, and the second counter outputting the address information relative to the second store during time nt, n being at least equal to 4, and control circuitry receiving said address information and the elementary time information for providing at the outputs of the control and address unit, memory address and read/write control information at times selected during the scanning period and sequentially, the addresses of the present lines which are scanned.

11 Claims, 16 Drawing Figures

4,493,051

COMMUNICATION LINE SCANNING DEVICE FOR A COMMUNICATION CONTROLLER

BACKGROUND OF THE INVENTION

This invention relates to a communication line scanning device provided, for a communication controller and more particularly, to a scanning device for scanning a variable number of lines on which data are exchanged at different rates and ensuring the data link control whatever the protocol may be.

Communication controllers are provided to be included in data teleprocessing systems, in order to manage the transmissions performed on the various lines connected thereto. In general, the main control of the teleprocessing network is concentrated in one or several central processing units (CPU) containing a directory of the rules applied for processing data issued from or directed to the terminal units or terminals of the teleprocessing network. Sending and receiving data through communication lines are managed by communication controllers depending on the central processing unit(s). But in addition to the execution of actual transmission controls, the controller is also in charge of executing given directory functions, in particular the functions directly relating to the standard transmission procedures. Due to this fact, the central processing units are exempted from carrying out the corresponding tasks and can be used for executing other works.

The communication controller consists in a sophisticated assembly provided with an intelligence mainly concentrated in one or several central control units (CCU). The central control units are connected, on the one hand, to the terminals through line adapters and, on the other hand, to the central processing units through channel adapters so called because they are connected to the channels of the central processing unit(s).

The line adapters can serve a certain number of lines by means of a cyclic scanning device and a random access memory assembly temporarily containing the data received or to be sent on the various lines as controlled by the scanning device.

In such an environment, each line adapter can be connected to a variable number of lines exchanging information with terminals of various types and therefore, the protocols and the transmission rates of the data on these lines, are different. In order to have a data communication network exhibiting a maximum flexibility, it is necessary to use the same scanning device in the line adapters whatever the number of lines to be scanned and whatever protocols and transmission rates are used on these lines.

In general, for a given communication controller as the IBM 3705 controller, there are provided various types of adapters the design of which depends on the characteristics of the lines connected thereto. It is obvious that this solution is expensive and is affected by a lack of flexibility since when the network configuration is to be modified, it is necessary to change the type of the adapter in function of each configuration.

Therefore an object of this invention is to provide a line scanning device able to scan lines of any type, on which data are exchanged at different rates using different communication protocols.

Another object of this invention is to. provide a line scanning device wherein the hardware is minimized.

SUMMARY OF THE INVENTION

This invention relates to a line scanning device operating under the control of a microprocessor associated to a control memory in which a memory location area is assigned to each line, provided for a line adapter in a communication controller for receiving or sending message bits in series from or to terminals connected to the lines using any protocols. It comprises first storing means including a first and a second memories, an area being assigned to each line in each of said memories which can be read and written in the same time and second storing means including a single memory in which a storage location area is assigned to each line. These storing means are addressed by a control and address means which includes first and second address counters under the control of an elementary time counter, the first counter outputting the address information relating to the first storing means during time t provided for scanning a line, and the second counter outputting the address information relative to the second storing means during time nt, n being at least equal to 4, and control means receiving said address information and the elementary time information for providing at the outputs of the control and address means, memory address and read/write control information at times selected during the scanning period and sequentially, the addresses of the present lines which are scanned.

A first logic circuit comprises bit deserializing/serializing means for receiving or sending a message bit during each scanning period, said circuit being connected to the lines on the one hand and to the first storing means on the other hand so that the information in the addressed storage location areas can be read, processed and re-written, modified or not in the first or second storing means depending upon the bit received or to be sent.

A second processing and monitoring logic circuit including means for assembling characters into half words and disassembling half words into characters, is connected on the one hand, to the control memory through an address bus and a data bus and on the other hand, to the first and second storing means for exchanging the messages to be transmitted between the control memory and the scanning device, in cycle steal mode.

DISCLOSURE OF THE INVENTION

Figure 1:
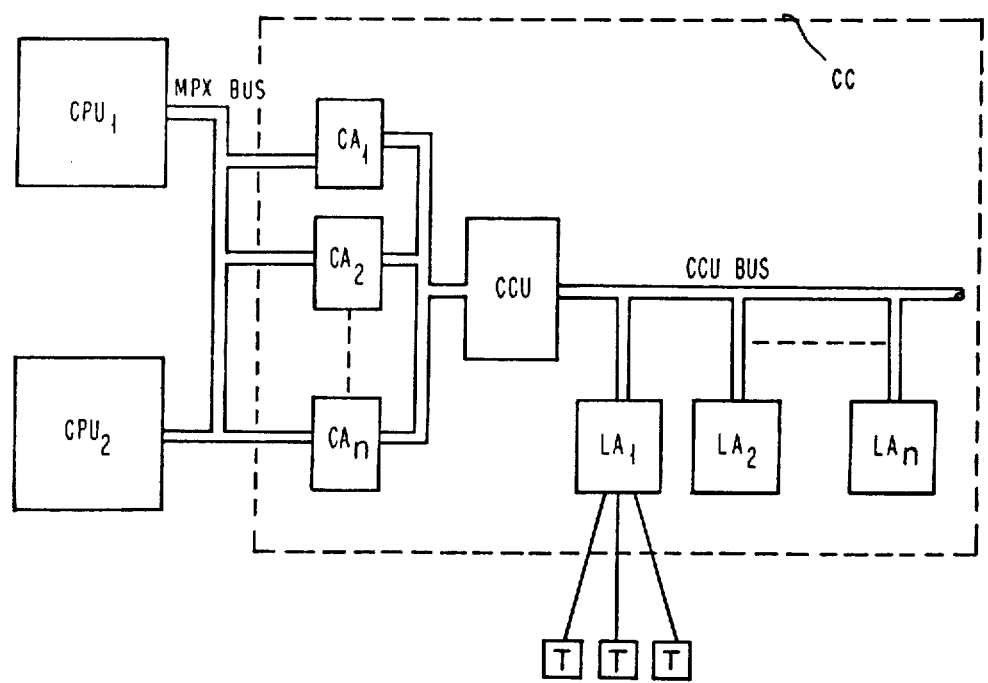
FIG. 1 is a schematic view of a communication controller in which this invention can be implemented.

The general scheme of a system in which the present invention can be implemented will be described in the following as an example, while referring to FIG. 1. Communication controller CC is an element of a teleprocessing network, an example of which is more particularly described in chapter 10 of the book entitled: "Teleinformatique" of G. Macchi and J. E. Guilbert. In the communication controller, the central control unit manages the data transmitted between terminals T and central processing units CPU1 and CPU2. The CCU unit is connected to multiplex channels MPX BUS of central processing units CPU1 and CPU2 through channel adapters CA1, . . . , CAn. It is also connected to terminals T through line adapters LA1, . . . , LAn connected to a bus CCU BUS.

In such an environment, this invention relates to the provision of a line scanning device provided for line adapters, said device being modular, that is to say that the same device can be used whatever number of lines is provided, whatever protocols and transmission rates are used on the lines connected thereto.

Figure 2:
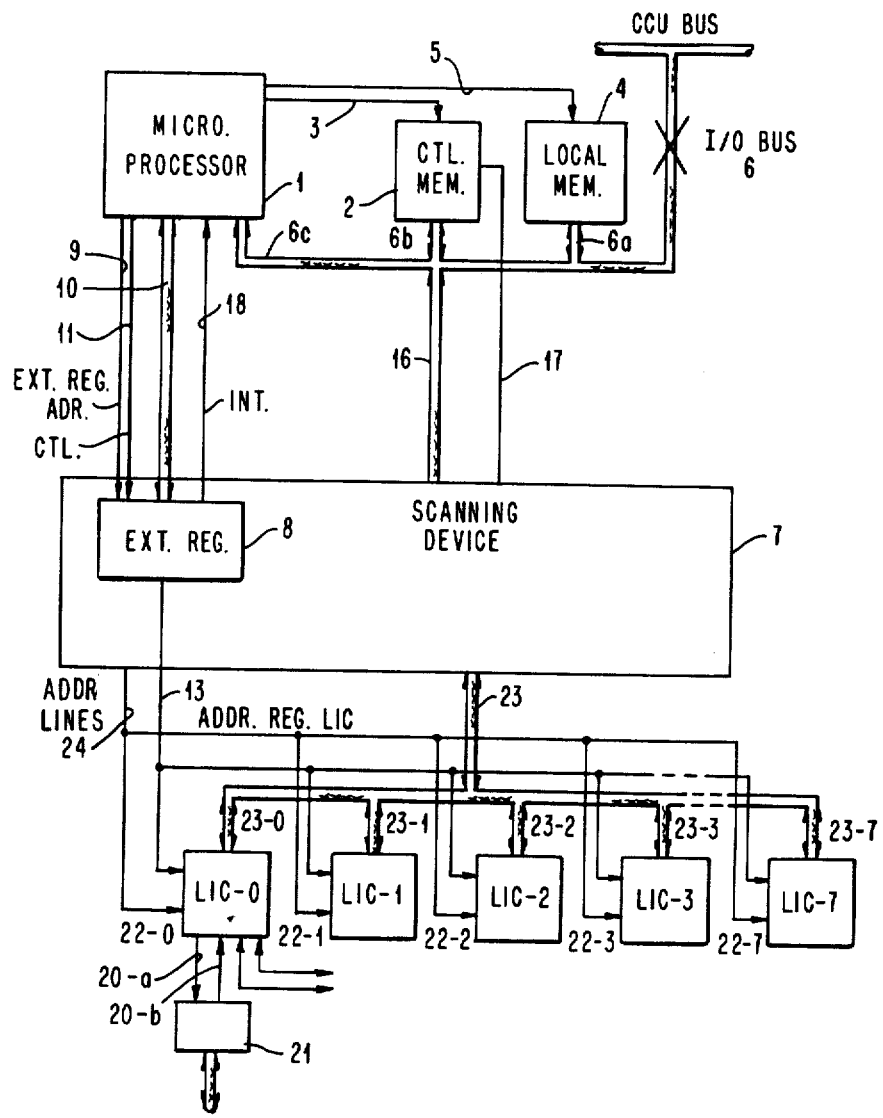
FIG. 2 illustrates one of the line adapters LA shown on FIG. 1.

FIG. 2 is a schematic view of an adapter according to this invention. It comprises a microprocessor 1 associated to a control memory 2 with a space for storing the microprocessor control microcode and a space for storing data. This memory is addressed by the microprocessor through addressing path 3. The microprocessor is also associated to a local memory 4 which is addressed by said microprocessor through addressing path 5. Input/output bus I/O Bus 6 conveys information between bus CCU BUS of the teleprocessing system and the line adapter throug program-initiated operations (PIO) and adapter-initiated operations (AIO). Bus 6 is connected to local memory 4 through a bus 6a, to the control memory through a bus 6b and to the microprocessor through a bus 6c.

Line scanning device 7 according to this invention is connected to the microprocessor-memory assembly.

External registers 8 can be addressed by the microprocessor through addressing path 9 and allow the microprocessor to communicate with device 7 through write and read operations performed in registers 8, under the control of control signals CTL on line 11. They are read or written by bus 10.

As described in the following, the scanning device includes amongst other elements, a storage arrangement in which areas are assigned to each line.

The scanning device of this invention communicates with storage 2 of the microprocessor in a so-called "Cycle Steal" mode in order to exchange information provided to or coming from lines to be scanned and a selected position of control memory 2. The data are exchanged through bus 16 and the memory is addressed through path 17. Interrupt path 18 is also provided to interrupt the microprocessor in certain conditions reported in one of the external registers.

The adapter is connected to the communication lines, one line being provided with two interfaces, a transmit interface and a receive interface 20a and 20b if said line is full duplex and with only one interface used either in receive mode or in transmit mode, if said line is half duplex, for receiving from the terminal and transmitting the information towards the terminal, possibly through a modem 21. Line interface circuits LIC, 22-0 to 22-7 are located between scanning device 7 and the lines, five circuits are shown on the drawing. Up to 8 circuits can be provided in a preferred embodiment. These interface circuits are connected to scanning device 7 through buses 23-0 to 23-7, respectively. Each circuit includes line drive and receive circuits and registers for buffering the data bits which are received or to be transmitted on the lines connected thereto. The registers are addressed under the control of device 7, through addressing bus 13 and the lines connected to the LIC are addressed by address bus 24.

The data can be received or transmitted using various protocols as for instance SDLC (Synchronous Data Link Control), BSC (Binary Synchronous Communication) and Start/Stop S/S. For each of said various protocols, one defines transmit parameters as the character length for the S/S and BSC protocols, the stop code length for the S/S protocol, the length and type of the CRC control characters (Cyclic Redundancy Code), etc.

The communication between the scanning device and the microprocessor is performed in two modes briefly described as follows: an asynchronous mode which requires the microcode to intervene into memory 2 and a synchronous mode independent from the microcode, as described in co-pending U.S. patent application Ser. No. 300,846 filed on Sept. 10, 81 and assigned to the same assignee.

The asynchronous mode is utilized for carrying out three types of operations.

1—Initiate Phase or set mode

The initiate phase is the phase during which the definition of a teleprocessing network takes place. As the system is set in the initiate mode, the particular parameters for each line of the network are stored in the storage arrangement of device 7, under the control of the microcode, through a procedure which will be disclosed further on. To this end, each storage location area in the memory which is assigned to each particular line, receives the set mode parameters which are the characteristics of the line, in a given field, via the external registers. The remaining fields are intended for storing the data, the control parameters and status information thereof which indicates that the exchange of data is terminated. During such a phase; the storage arrangement of device 7 is personalized with respect to the network configuration.

2—Managing of the modem control interface leads

Interface wires (not shown in FIG. 2), are associated with lines 20a, 20b, and the communication control signals are transmitted on these wires. In order to process the control signals on these wires, it is not necessary to have optimum performance but a maximum of flexibility is required so as to be able to manage various types of modems and procedures which are known at present or which might be developed in the future.

The control information applied to the modem is sent by the microcode in the asynchronous mode, through devices 10, 9 and registers 8 and are also stored in the so-called "modem-out" register. Each time the corresponding line is scanned, the pattern on these wires is compared with the pattern on the line drive circuit which is obtained through local receive circuits, by means of a mask determined by the microcode. In the case the two patterns do not match, a "drive circuit check" error condition is generated. In this way, the drive circuits of the involved modem are checked.

Upon each scanning period, the information on the wire coming from the modem is stored in a "modem-in" register and is compared with the "modem-in" information stored in the memories of the scanning device 7 in locations corresponding to the lines to be scanned. This compare operation is initiated by the microcode and is carried out by means of a mask determined by the microcode. If the two patterns do not match, an interrupt request is generated and the comparison is interrupted unitl the microcode starts another try. This prevents several interrupts from occurring in the case of a permanent change on the control wires of the modem because of erratic error conditions.

3—Processing the interrupt requests

The synchronous mode is utilized for the cycle steal-type information transfer directly into control memory 2 of the microprocessor, through path 16. The associated information: data, control parameters, status information, is transferred from/into memory 2, with no microcode intervention.

The portion of memory 2 which has been reserved for this purpose, is divided into memory areas, one area being assigned to each line.

The cycle steal-type data exchange is a well-known operation, and is carried out through controls generated from microprocessor 1. Device 7 can have access to memory 2 when the microprocessor has answered a cycle steal request with a "granted cycle steal" signal. Addressing of memory 2 is carried out through path 17, and data transfer through bus 16. Scanning device 7 of this invention, is schematically shown on FIG. 3.

It is comprised of two data processing devices 300 and 301. First device 300 is connected to line interface circuits LIC 22 to deserialize and serialize the bits which are received and to be transmitted and to monitor the various transmission protocols in use and to process the control interface wires of the modems connected to the LIC. Second device 301 which is connected to microprocessor 1 of FIG. 2 through data bus 16 and addressing bus 17 assembles the characters into half-words and disassembles the half-words into characters and ensures the exchanges with the microprocessor memory in cycle steal mode. It arranges the data which are received or to be transmitted into the memory, provides the microprocessor 1 with the status information resulting from the operations which have been performed and handles the interrupt requests for microprocessor 1.

These two processing devices are controlled by control and addressing device 303.

Processor 300 includes an assembly 306 of two memories B and C which can be read and written in the same time and a monitoring logic circuit 308 which ensures the serialization/deserialization functions, controls the modems and monitors the various protocols in use. Under the control of read and write control signals (on line 352), it causes a location addressed by device 303 to be read and information read on bus R 301 to be transferred to a destination depending on the operation in progress, and data modified or not according to the type of operation, to be re-written in this same location through bus W 312.

Device 301 includes a memory A 314 and a monitoring logic circuit 316. As for device 301, reading and writing in the addressed locations of memory A 314, are controlled by signals on line 352, the read data being transferred through bus R 318 and the data to be written, through bus W 320.

Logic circuits 316 and 308 can cause memories A, B and C to be written through line 322.

The address information is generated by device 303 on line 324, to address memories A, B and C and the lines on the LIC circuits through lines 324-A, 324-B, 324-C and 324-LIC.

Control and addressing device 303 comprises external registers 8 of microprocessor 1 which constitute the means allowing the microprocessor to communicate with scanning device 7, and an address select device 326. Device 326 controlled by a clock CLK 328 controls the sequential addressing of memories A, B and C in the normal scanning mode. This scanning can be interrupted by a control signal on line 330 transmitted by the microprocessor through an external register and the memories are addressed at this time from the information contained in one of external registers 8 through line 332.

It is this addressing mode which is used during the initiate phase in set mode.

The data are transferred from external registers 8 to memories A, B and C through buses 334, 336 and 337 into the locations addressed by address select device 326. Bus 338 allows data to be transferred between the external registers and the registers located in the LIC circuits through logic circuit 308. The LIC circuit registers are addressed by circuit 326 and the addressing signal is generated on line 340. Lines 342 and 344 provide circuit 326 with signals indicating the presence of LIC circuits and their types, i.e. whether they permit or not to connect one single line or more to allow the scanning cycles to be adapted to the network configuration in accordance with this invention, in a manner which will be described later.

Logic circuit 308 communicates with the LIC circuits through control line CTL 346, data bit exchange line 348 and register transfer line 350. A control line 352 allows controls to be sent to processing devices 300, 301, 303.

In a preferred embodiment, the scanning device allows 1 to 32 full duplex data transmission lines to be connected.

Scanning is sequentially carried out. The time interval between two line scans must be shorter than the time interval between two bits which are transmitted or received. The maximum scanning speed of the device of the invention is 350,000 received or transmitted bits per second (transmission through four wires also called "full duplex" transmission). This scanning power is automatically distributed amongst the number of connected lines. If there is one line, it would be able to operate at 256,000 bits per second. If there are four lines, they would be able to operate at 64,000 bits per second and if there are thirty two lines, they would be able to operate at 9600 bits per second. As said above, the lines are connected to scanning device 7 through interface circuits LIC 22. In a preferred embodiment, each LIC circuit can be connected to one or four lines. It is possible to have one to eight LIC circuits, each one being provided on a so-called LIC card and connected to a scanning device 7. The number of the LIC circuits which are connected, automatically modifies the line scanning. It is the function of lines 342 and 344. Line "LIC PRESENT" 342 allows circuit 303 to know the number of the LIC circuits which are installed, line "LIC 1 line" 344 indicates that the installed LIC circuit is connected to only one line. Therefore, the LIC circuits must be installed in the 0 to 7 order without empty interval. These lines condition the line scanning which is always performed in the following order.

The first line (line 0) of the first LIC, the first line of the second LIC, etc., the first line of the last installed LIC, then the second line (line 1) of the first LIC, the second line of the second LIC, etc., the second line of the last installed LIC, then the third line (ligne 2) of the first LIC, etc., the third line of the last installed LIC and at last, the fourth line (line 3) of the first LIC, etc., the fourth line of the last installed LIC and we come back to the first line of the first LIC. If there is only one line on a LIC circuit, said one line will be scanned four times more often than the other lines.

Figure 4:
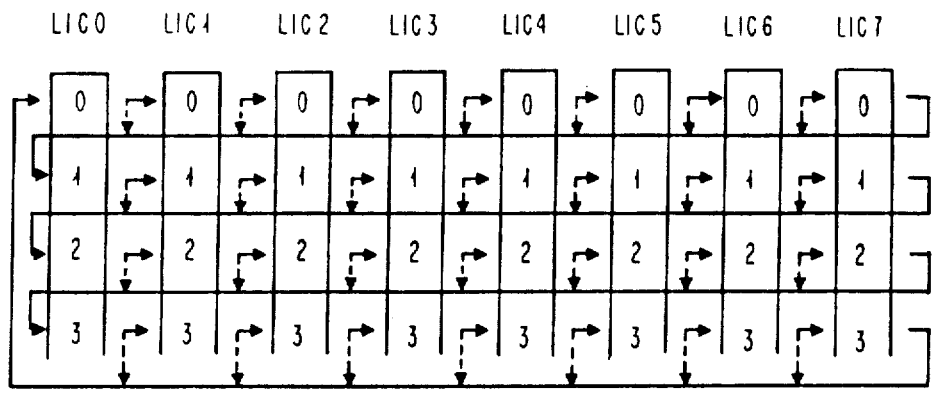
FIGS. 4 and 5 illustrate the line scanning diagram in two different network configurations.
Figure 5:
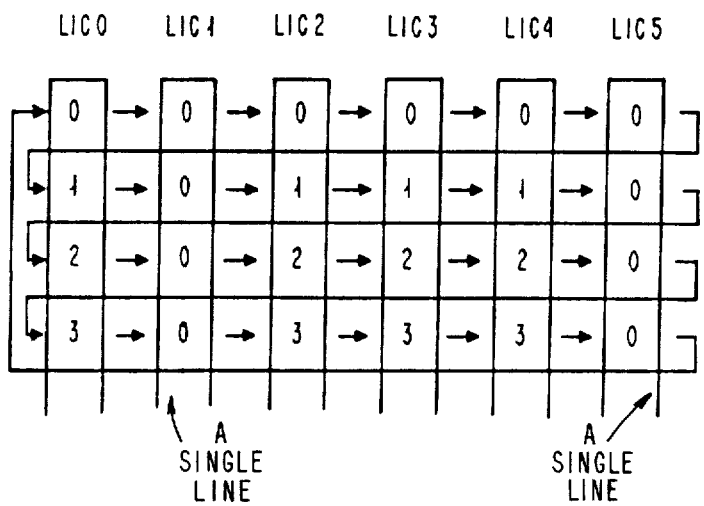

The scanning scheme is shown on FIGS. 4 and 5. FIG. 4 shows the scanning scheme when all LIC circuits 0 to 7 are connected to four lines (line 0 to line 3) and FIG. 5 shows the scanning schema when there are 6 LIC circuits amongst which LIC circuits 1 and 5 are connected to only one line. Thus, it appears clearly that line 0 of LIC cards 1 to 5 is scanned four times more often.

This arrangement has been used in the preferred embodiment of the invention. It should be well understood that the number of the lines can be changed without departing from the scope of this invention.

Figure 3:
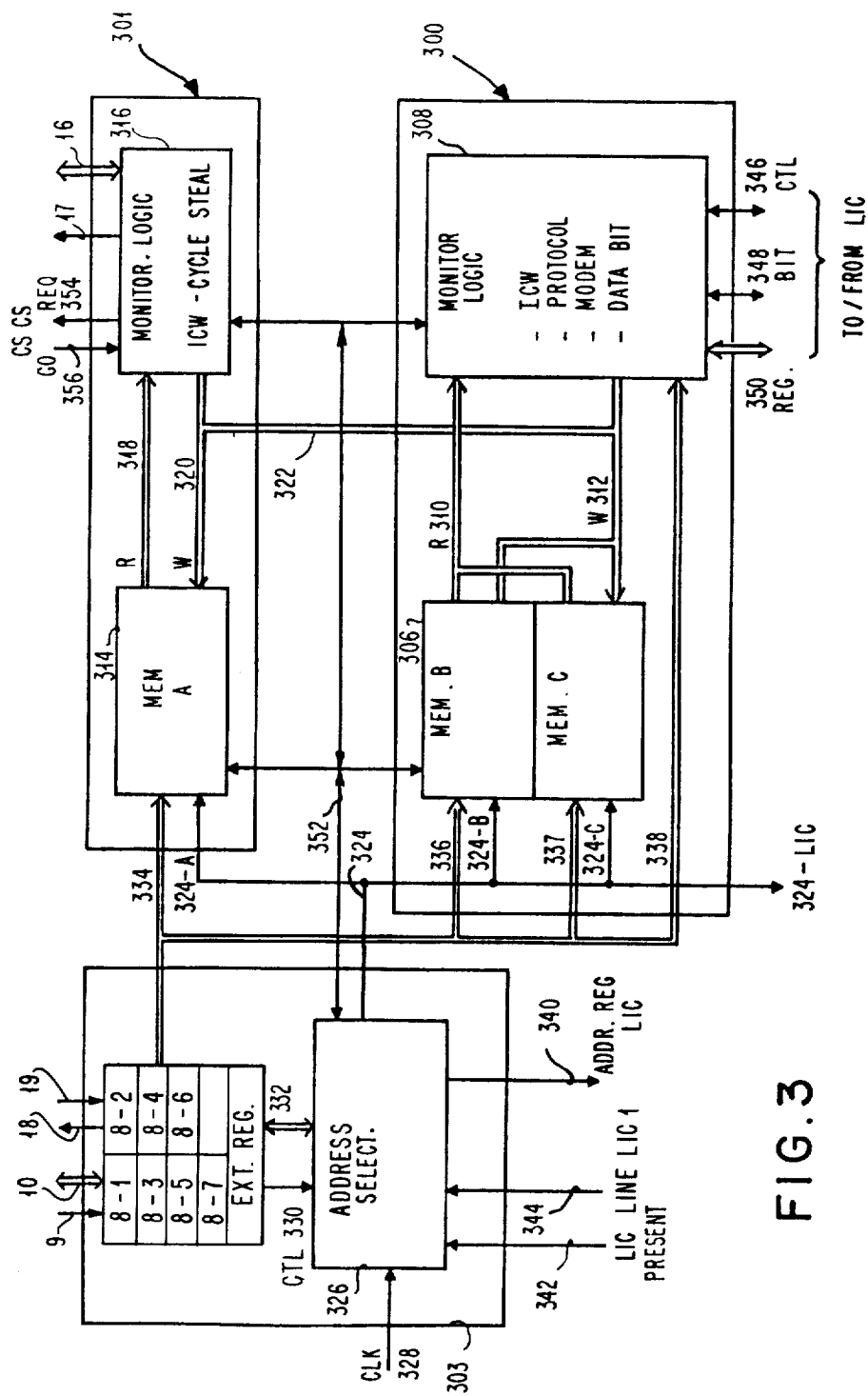
FIG. 3 illustrates scanning device 7 shown on FIG. 2.

FIG. 3 shows the control and address lines with a single wire as opposed to the data lines but it is obvious that the control lines can be provided with several wires, for instance each LIC circuit connected to circuit 7 is provided with a "LIC present" wire and a "LIC 1 line" wire.

Two interface control words ICW (arranged in half words HW1 to 4, one for the "transmit" interface and one for the "receive" interface) are associated to each line in memories A, B, C 314 and 306. These control words are provided with the following formats:

| MEMORY B OF ASSEMBLY 306 | | | | | |
|---|---|---|---|---|---|
| | Receive Interface | | | Transmit Interface | |
| HW ↓ | Byte 0 | Byte 1 | HW ↓ | Byte 0 | Byte 1 |
| 1 | SDF | SCF | 1 | SDF | SCF |
| 2 | PDF | PCF | 2 | PDF | PCF |
| 3 | — | — | 3 | DLE | — |
| 4 | Synch 2 | Synch 1 | | | Synch |

Memory B is assigned to the data bit service function.
SDF (Series Data Field)
is, therefore, a field in which the data are brought in series from the line for the receive interface. For the transmit interface, the data in this location are TRANSMITTED bit after bit.
PDF (Parallel Data Field)
In receive mode, the data serialized in the SDF field go into the PDF field after the character has been assembled. In transmit mode the data placed in this field go into SDF to be transmitted in series bit after bit.
SCF (Control Field)
is a control field associated to the SDF field for containing control information.
PCF (Control Field)
is a control field associated to the PDF field for containing control information.
Synchro 2, Synchro 1
are characters to be recognized in order to ensure line synchronization.
DLE
In the BSC mode, it is a character to be automatically sent on line.

| MEMORY C | | | | | |
|---|---|---|---|---|---|
| | Receive Interface | | | Transmit Interface | |
| | Byte 0 | Byte 1 | | Byte 0 | Byte 1 |
| | | S/S MODE | | | |
| HW ↓ | | | HW ↓ | | |
| 1 | Set :INIT Mode | Command CMD | 1 | Set :INIT mode | Command CMD |
| 2 | — | — | 2 | — | — |
| 3 | Input Modem Pattern | Mask | 3 | Immediat Output Modem | Mask |
| 4 | — | — | 4 | Stacked Output Modem | Mask |

| SDLC and BSC MODES (SDLC: Synchronous Data Link Control BSC: Binary Synchronous communication) | | | | | |
|---|---|---|---|---|---|
| HW ↓ | | | HW ↓ | | |
| 1 | Set :INIT Mode | Command CMD | 1 | Set :INIT Mode | Command CMD |
| 2 | BCC2 | BCC1 | 2 | BCC2 | BCC1 |
| 3 | Input Modem Pattern | Mask | 3 | Immediat Output Modem | Mask |
| 4 | — | — | 4 | Stacked Output Modem | Mask |

Memory C is assigned to the line service function.
The set mode field is used in the initiate phase for storing the line protocols.
The input modem, immediat output modem, stacked output modem and mask patterns, are used for managing the modem control wires used for transmitting the control signals associated to the line.
BCC1 and BCC2 are the characters of the redundant cyclic code.

| MEMORY A | | | | | |
|---|---|---|---|---|---|
| | Receive Interface | | | Transmit Interface | |
| HW ↓ | Byte 0 | Byte 1 | HW ↓ | Byte 0 | Byte 1 |
| 1 | New PDF | SCF | 1 | CTR Insert Synchro Counter | SCF |
| 2 | Next PDF: SPDF | Interrupt Request | 2 | Next PDF: SPDF | Interrupt Request |
| 3 | Address for Control Memory 2:SA | | 3 | Address for Control Memory 2:SA | |
| 4 | Control Parameter 301 | Time Counter CTR TPS | 4 | Control Parameter 301 | |

Memory A is assigned to the character service function.

Time Counter CTR TPS

It can count times varying from 2 ms to 3 s. It can be used by the microprocessor for generating an interrupt at the end of a fixed time. It is also used in BSC for controlling the reception of the timing characters and in emission, for inserting the same characters every second provided that the Insert synchronization bit is present.

The tasks are optimally distributed amongst processing devices 300 and 301. For this purpose, processing device 300 operates at the bit rate and device 301 operates at the byte rate, therefore eight times slower than device 300. The distribution of the functions is ensured in such a way that it is possible to use the same elements in each device 300 and 301 to perform different functions. Said distribution of the functions will be described in the following.

Four registers of register assembly 8 are assigned to the management of the read or write access to the locations of memories A, B, C and into the LIC circuits.

First register 8-1 (bits 2 to 7+parity) is charged by the microprocessor control microcode to determine the line address (bits 2 to 6) and the interface type (bit 7=0 for an transmit interface and bit 7−1 for a receive interface).

Second register 8-2 (bit 0 to 7+parity) is the data intermediate register. In write mode, it is charged by the microcode with the data to be transferred. In read mode, the microcode finds the data to be read in this register, at the end of the operation.

Third register 8-3 (bits 0 to 5+parity) is charged by the microcode to specify the operation to be carried out (read or write, memory area to be accessed), and to initiate this operation at a time more particularly established to allow the data to be transferred without disturbing the synchronous operation in "cycle steal" mode of device 7.

```
                Register 8-3 is arranged as follows:
Bit 0:       0   =   Read, 1 = Write
Bits 1.2:    00  =   operation in memory B
             01  =   operation in memory A
             10  =   operation in memory C
             11  =   operation in the LIC circuits
Bit 3:               if bit 1, 2 ≠ 11
             0   =   operation on byte 0 (even)
             1   =   operation on byte 1 (odd)
                     if bits 1, 2 = 11
             0   =   operation on the LIC
Bits 4, 5:           if bits 1, 2 ≠ 1
                     Bit 4, 5 specify the
                     half word in the memo-
                     ries which are to be
                     accessed in the field
                     assigned to the line
                     interface loaded into
                     8-1
                     if bits 1, 2 = 11,
                     bits 4, 5 specify the
                     register in the LIC
                     circuits.
        Register 8-4 provides the status of the access
        operation performed by the microprocessor.
Bit 0,  active  =   operation not completed
Bit 1,  active  =   there is an error
Bit 4,  active  =   an error has appeared when
                    addressing a LIC circuit
Bit 5           =   the error has appeared
                    within device 7.
```

Registers 8-5 and 8-6 constitute the interrupt registers.

When the scanning device sends an interrupt to the microprocessor, it charges these registers to provide the required information relating to the interrupt, to the microcode.

The address of the interface which has required the interrupt is located in register 8-5, bits 0-7 of which have the following meaning:

| | |
|---|---|
| Bits 2-6 | line address |
| Bit 7 | determines the interface |
| | = 0 transmit |
| | = 1 receive |
| Bits 0, 1 | = 11 |
| | means that additional information can be found in register 8-6. If not bit 0, 1 = 00. |

This register cannot be written by the microcode.

The cause of the interrupt can be found in registrer 8-6 the bits of which have the following meaning:

If the interrupt only indicates that an end of area is reached (as explained in the following), there is no additional information in this register. Bits 0 and 1 of register 8-5 are at 00.

In the other cases, the cause of the interrupt is defined as follows:

Bit 0=0, bit 7=1 means that the information is a normal work information. In this case:

| | | |
|---|---|---|
| | For a Receive Interface | |
| Bit 1: | Capacity overun | |
| Bit 3: | Modem status change | |
| Bit 4: | Notifies the microcode that an ending condition has been loaded into the cycle stolen status. | |
| | For a Transmit Interface | |
| Bits 1, 4 | = 00 | No information |
| | 01 | End of transmission |
| | 10 | Character underrun |
| | 11 | Character sequence invalid (BSC) |
| Bit 2 | = | Time Out |
| Bit 3 | = | Modem status change |

When powering the unit, a reset command is automatically received from the microprocessor through line CTL 11 and external register 8-7 and transmitted to processing devices 300 and 301 through line 330 for sequentially scanning and erasing the memories as well as the LIC circuit registers. No line scanning is performed. This "scanning inhibited" condition is maintained by bit 2 of external registre 8-7, which is set to 1 at the end of the erasing of the memories. The microprocessor will have to reset this bit in order to start scanning later on.

The microprocessor enters the set mode phase during which the ICW words are written into memories A, B and C and the LIC circuit registers are loaded through external registers 8-1, 8-2, 8-3 in order to prepare each line interface to the tasks to be carried out.

When this phase is completed, the microprocessor reads register 8-4, which indicates to said microprocessor the completion of the operation and the status i.e. with or without error, in which bit 0 of this register is set to 1 at the beginning of the operation and to 0 when the operation is completed.

The set mode information is as follows:

For the ICW words of memory A: the address of the first half word of the memory 2 area assigned to this interface in "Control memory address" half word 3 and the parameter relating to this half word indicating the condition of use.

For the ICW words of memory C: the line protocol type to be used and as required, the command to be sent to the modem.

Figure 6:
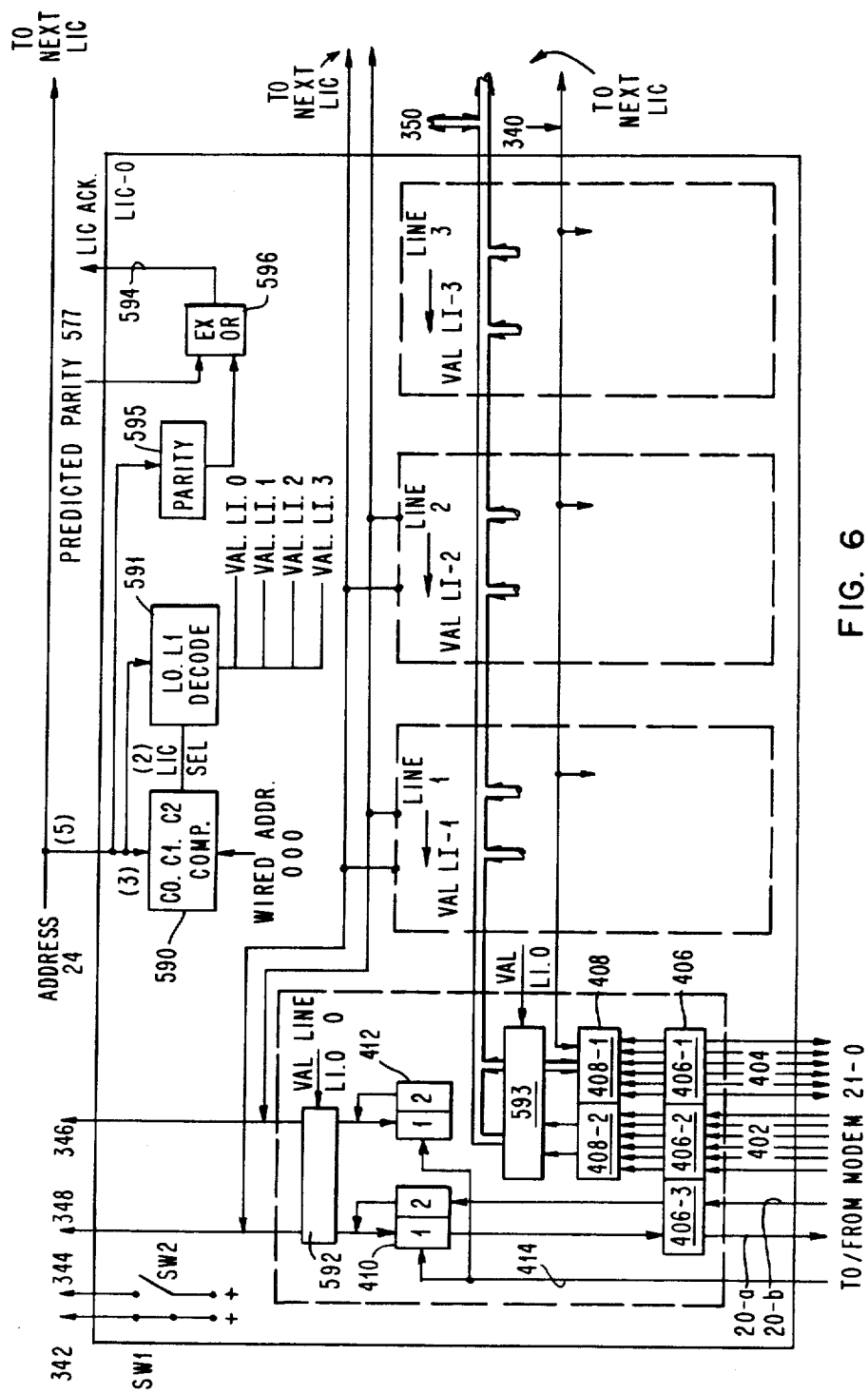
FIG. 6 is a schematic view of a line interface card LIC.

Before proceeding to the description of the operation of the address generating unit of the invention, one will refer to FIG. 6 for a description of the general scheme of a LIC interface circuit.

FIG. 6 illustrates one of the interface circuits LIC.0 to which four transmission lines are connected through modems 21-0 to 21-3. These circuits are provided on a card and in the following either of the terms "LIC circuits" or "LIC cards" will be indifferently used.

Only the circuit relating to line 0 connecting modem 21-0 and the scanning device, will be described in the following, said circuit being the same for all the modems.

The data bits are provided to the modem through transmit interface 20-a and are received from the modem by the scanning device through the receive interface 20-b. Two sets of control wires 402 and 404 allow the control signals associated to the interfaces to be exchanged, said signals being specified by the various standards. Wires 20-a and 20-b, 402 and 404 are connected to a receiver/drive circuits assembly 406. Receivers 406-2 receive control signals from 402 and driver 406-1 send signals to the modem through 404. Circuit 406-3 includes a receiver for interface wire 20-b and a driver for interface wire 20-a.

Registers 408-1 and 408-2 are the LIC registers which can be addressed by address line 340. Register 408-2 receives information from receivers 406-2 which corresponds to the "input modem" configuration and it can be read and its contents can be transmitted to scanning device 7 through bus 350 common to all LIC circuits. Register 408-1 transmits the output modem configuration information to wires 404 through drivers 406-1. It can be written and read by the scanning device through bus 350.

Two latches 410-1 and 410-2 are set by the clock of modem H or an external clock for the lines which are not connected to a modem on line 414 in order to store the bits to be transmitted and the bits received at bit-time. The bit to be transmitted is issued from line 348 and stored into latch 410-1 and the bit received is issued from interface 20-b and is stored into latch 410-2. It is transmitted to the scanning device through line 348.

Two service latches 412-1 and 412-2 are associated to latches 410-1 and 410-2. Latches 412-1 and 412-2 are set by the modem clock when a bit is applied into latches 410 to indicate that a bit is ready to be received or sent and they are reset by the scanning device when these bits have been processed. These latches provide the CTL bit service control signals on line 346.

Each LIC card bears two indications "LIC present" and "LIC 1 line" on wires 342 and 344. Up level signals are generated on these lines by means of switches SW1 and SW2 connecting these lines to a positive voltage when the LIC card is present in the network and when this card is connected to only one line.

An address decode circuit is provided on each LIC card and comprises a comparator COMP 590 which receives the LIC address generated by address select device 326 in a way which will be described with reference to FIG. 9 and the LIC wired address, for instance 000 for LIC 0. It outputs a selected LIC signal LIC SEL when the comparator detects an equality. A decode circuit 591 receives the line address bits on LIC L0 and L1 (generated by the circuit of FIG. 9) and provides line address valid signals VAL LI.0, VAL LI.1, . . . , VAL LI.3.

Two gate circuits 592 and 593 are provided and open by valid signals VAL LI.0 for line 0 of the card, when this line is scanned in order to allow the information to be transferred between lines 348-346 and latches 410, 412 and between register 408 and bus 350 respectively.

Circuit 595 generates the parity of the received address and this generated parity is compared with the predicted parity (output 577 of the circuit shown on FIG. 9) in exclusive OR circuit 596 which generates the "LIC error" or "LIC no error" LIC ACK information at its output 594.

Now the operation of the scanning circuit shown on FIG. 3 will be described.

The system being set at the end of the initiate phase, the microprocessor sends a scan start command through register 8-7.

The scanning operation starts with the first receive interface. Register 408-1 containing the "modem-in" pattern is addressed by device 303, line 340 and read by bus 350. This pattern indicates whether the corresponding modem is ready to operate or not. This pattern is compared, in logic device 308, with the preceding conditions of the control wires contained in the "modem-in" field of the ICW of the scanned line in memory C. The mask associated to this field allows the comparison to be limited to the wires really in use. In effect, according to the type of modem, the number of the control wires changes. A maximum of 6 wires is shown on FIG. 6.

If there is a difference between the two patterns, this MC (Modem Change) information is stored into the SCF field of memory A and, in the same time, the new modem-in pattern is re-written into the ICW word.

When the interface is scanned again, the MC information in the SCF field is re-written into register 8-6 and the address of the corresponding interface in register 8-5, which causes an interrupt request to be applied to the microprocessor which can read the modem condition in the modem-in field of the interface ICW word, in memory C. If the modem is ready to operate, the microprocessor can start an emission on the transmit interface by writting the start bit into the ICW word of memory A through the asynchronous channel.

When this interface is going to be scanned in device 301, the corresponding position of the ICW in memory A is addressed, the first two characters to be transmitted are transferred from the microprocessor memory in cycle steal mode, the first one into the PDF field of memory B and the second one into the next PDF field: SPDF of memory A.

The first one is written into the first PDF field of memory B with a start bit in the associated PCF control field.

When processing device 300 scans this interface, i.e. when the positions of memories B and C assigned to this interface, are addressed, the first character to be transmitted which is in the PDF field of memory B, is serialized by sending a bit toward the interface each time, when scanning the line, the associated LIC circuit indicates that the preceding bit is sent on the interface through control wire 346.

When sending the first bit towards the LIC card, device 308 re-writes the PDF character into the SDF area of memory B and requires, through control line 352, reading of the next character from memory A, and writting of the same into the PDF field of memory B. This request is made by writting a "service character" bit into the SCF control field of the ICW word in memory A.

Several cases can appear when this interface is scanned again in processing device 301. If there is a character stored in "next PDF" SPDF half-word 2, it is read and re-written into PDF half word 2 of memory B. If there is no stored character, device 301 triggers a cycle steal operation in order to read the following two characters to be sent on the line, from the microprocessor control memory.

If device 301 detects that these two characters are the last characters of the area assigned to this interface, an interrupt request is sent to the microprocessor through the "interrupt request" field in memory A which is transferred to external registers 8-6 to indicate the cause of the interrupt: "end of area" and the address of the related interface is written into register 8-5. Then, the microprocessor knows that the control memory area has been emptied and that it should be filled again with the following of the message to be transmitted.

The microprocessor places a parameter indicating the end of the transmit operation into the "command 301" field of memory A.

When this parameter is read through device 316, it is re-written to be retained until the last character of the area is sent to memory B. When device 300 requires a new character, the parameter indicating the end of the transmission operation is sent thereto. Then three bits are sent on line by device 300 before stopping the transmission in order to make sure that the last character has been really sent.

Another function of logic circuit 308 consists in adding the information required by the line protocol in use (start and stop bits in S/S mode, insertion of zero in SDLC mode, etc.) to the transmitted characters in a way to be described later.

For a receive interface, starting is performed as in transmit mode, by writting through the asynchronous channel, the start bit into the SCF control field of the location of memory A associated to the scanned receive interface. During the scanning of the related interface, when this bit is read by logic 316, it is written in the SCF control field of memory B.

During the scanning of the interface, when logic 308 reads this bit, the bits received on the line are assembled in the SDF area of the corresponding ICW word in memory B. When a complete character is received, it is written in the PDF field. When this interface is scanned in device 301, this character is written in the "PDF" location of memory A. The next character will be written into the next PDF and when the two fields are full, they are transferred in cycle steal mode into the microprocessor memory.

As in transmit mode, when the memory area associated to this interface is full, an interrupt request is sent to the microprocessor.

The format of the various parameters in use will be given in the following.

The formats of the set mode parameters, field HW1, byte 0, memory C, are as follows: these formats are given as examples and it is obvious that if other protocols or transmission modes are used, other parameters could be defined. These parameters are placed in asynchronous mode into byte 0 of half word 1 of memory C.

Each paramter is comprised of 8 bits 0 to 7. These parameters are the same whether the interface is a transmit or a receive interface.

Bits 0, 1, 2:
| | |
|---|---|
| 1 0 1 | line S/S |
| 1 1 0 | line SDLC without interrupt at first flag. |
| 1 1 1 | line SDLC with interrupt at first flag. |
| 1 0 0 | line BSC controlled by code |
| 0 0 . | line BSC/ASCII (ASCII = American National Standard Code for information Interchange) |
| 0 1 . | line BSC/EBCDIC |

Bit 3:

This bit is not utilized in modes S/S and SDLC. In mode BSC, it is utilized as follows
BSC ASCII / EBCDIC, bit 3 should be taken into consideration together with bit 2
| | |
|---|---|
| 0 0 | character ITB (end of intermediate block) is not a control character |
| 1 0 | mode EIB (error information block) |
| 0 1 | mode ITB (the ITB character is recognized and the CRC is controlled) |
| 1 1 | mode EIB + change of block |

BIT 4:

According to the protocol, this bit means:
| | |
|---|---|
| S/S | stop code length  0 = one bit   1 = two bits |
| SDLC | code NRZI when equal to 1 |
| BSC | thru code: unused |

BSC ASCII / EBCDIC bit 4 should be taken into consideration together with the following bit.

Bit 5:

This bit is not utilized for protocols S/S. For protocol BSC, it is utilized as follows:
| | |
|---|---|
| BSC | thru code: when 1, means for mono SYNC |

BSC ASCII / EBCDIC together with bit 4, indicates the error control type.
| | |
|---|---|
| 1 0 | CRC S (CRC = Cyclic Redundancy checking) |
| 0 1 | CRC B |
| 0 0 | CRC B or S/STC considered in CRC |
| 1 1 | LRC/VRC |
| S | = SDLC |
| B | = BSC |
| STC | = Start Control Character |
| LRC | = Longitudinal Redundancy Checking |
| VRC | = Vertical Redundancy Checking |

Bits 6 and 7:

For protocols S/S, BSC thru code, these two bits give the following character lengthes:
| | |
|---|---|
| 0 0 | 5 bits/character |
| 0 1 | 6 bits/character |
| 1 0 | 7 bits/character |
| 1 1 | 8 bits/character |

If in SDLC, bits 5, 6, 7 are used to count the successive ones to be sent on line at the beginning, they are set to zero.

The control parameters are sent to device 7 by the control microcode in order to start or stop the emission of the data on a "Transmit" interface or the reception of the data on a receive interface. These controls are sent to the appropriate line by using the asynchronous path, external registers 8, bus 11 and by sending the control parameters to memories A, B, C of device 7.

There will now be given as an example, a definition of the control parameters which can be used.

| Definition of the Control Parameter Field |
|---|
| "Transmit" Interface |
| This field is comprised of 16 bits 0 through 15, these bits being located in half word 4 of memory A and having the following means: |
| Bit 0   valid burst (the burst can be transmitted). This bit is indicative that the associated data burst contains data to be sent. It is |

-continued

| | Definition of the Control Parameter Field |
|---|---|
| | reset to zero by the control microcode and set to 1 by the scanner when the status information is exchanged. |
| Bit 0 | = 0 valid burst |
| Bit 0 | = 1 non valid burst |
| Bit 1 | Start data transmission |
| Bit 2 | interrupt requested. This bit forces device 7 to ask for an interrupt, through an external register and line 18 when the last character in the burst has been sent into the appropriate position in memory A which corresponds to said interface. |
| Bit 4 | PDF indicator → 0: SPDF empty <br> 1: SPDF full |
| Bits 5 6, 7 | number of data bytes in the burst. These bits are indicative of the number of the bytes to be taken from this burst (from 1 to 8 bytes from the beginning of the burst). |
| Bit 8 | send CRC (valid for protocol SDLC). This bit is indicative that at the end of the data burst, the accumulated CRC should be sent. |
| Bit 9 | start on odd byte. When this bit is set to 1, the scanning device acts as if the first byte (byte 0) of the burst had already been processed (this makes it possible to start with the second byte : byte 1, odd). |
| Bits 11 12 | When "00" intermediate data "01" last data, end of message EOM. <br> In that case, device 7 sends the complete burst. When the last bit of the last character to be sent has been transmitted to the modem, device 7 interrupts the control code and stops the transmission (EOT). When 1 0 the data should go on being transmitted continuously (wrapping). When the last data in the burst has been read, the scanning device comes back to the first data. <br> When 1 1 end of the message with turn-around same operation as previously (0 1) but the line is automatically set in start receive mode at time EOT (end of transmission). |
| Bit 13 | Either no zero insertion into this data, no accumulation CRC (SDLC) or interrupted transmission (S/S). This bit requires that device 7 does not perform the zero insertion for all the data bytes within this burst. |
| Bit 14 | Start the time counter. |
| Bit 15 | Send the contents of the "modem-out" register at the end of the burst. "Receive" interface |

Only eight bits are utilized in the control parameter field, byte 0 of half word 4 of memory A.

| Bit 0 | valid burst. (burst ready to receive data which can be sent by device 7. It is reset to zero by the control microcode and set to 1 by the scanning device when the status information is exchanged. |
|---|---|
| Bit 0 | = 0 valid burst |
| Bit 0 | = 1 non valid burst |
| Bit 1 | Start data reception : start bit |
| Bit 2 | ask for an interrupt request at the end of the burst. |
| Bit 4 | PDF indicator → 0 = SPDF empty <br> 1 = SPDF full |
| Bits 5, 6, 7 | maximum number of bytes to be put in this burst. |

In memory B, the bits of the SCF control field, byte 1, of half word 1 have the following meaning:

| RECEIVE INTERFACE | | TRANSMIT INTERFACE | |
|---|---|---|---|
| Bit 8: | end type 1, E1 | Bit 8: | send CRC |
| Bit 9: | bit counter | Bit 9: | bit counter |
| Bit 10: | bit counter | Bit 10: | bit counter |
| Bit 11: | change of modem status MC | Bit 11: | change of modem status MC |
| Bit 12: | end type 2 E2 | Bit 12: | End of transmission (EOT) |
| Bit 13: | end type 3 E3 | Bit 13: | no zero insertion, no accumulation CRC (SDLC), stop transmission following an error in S/S mode |
| Bit 14: | bit counter | Bit 14: | bit counter |
| | | Bit 15: | send modem-out after end of transmission |
| Bits 9, 10, 14 constitute a 3-bit counter to count the data bits | | | |

The bits of the PCF field, byte 1, half word 2 of memory B have the following meaning:

| RECEIVE INTERFACE | | TRANSMIT INTERFACE | |
|---|---|---|---|
| Bits 9 & 10: set at 0 | | Bit 8: | send CRC |
| | | Bit 9: | 0 |
| | | Bit 10: | 0 |
| Only bits 11 and 14 are used | | | |
| Bit 11: | recall change of modem status | Bit 11: | recall change of modem status |
| | | Bit 12: | EOT |
| | | Bit 13: | no insertion of zero, stop emission after error |
| Bit 14: | starting | Bit 14: | starting |
| | | Bit 15: | send modem out |

In memory C, the control field containing character and line service information has the following meaning, byte 1 of half word 1.

| Receive Interface | | Transmit Interface | |
|---|---|---|---|
| S/S MODE | | | |
| Bit 9 | in phase character. Indicates that the synchronisation is obtained. | Bit 9 | change of modem status |
| Bit 10 | first bit detected | Bit 10 | first bit detected |
| | | Bit 11 | underrun condition |
| Bit 13 | STOP phase indicates end of character, STOP bits are to be sent | Bit 13 | STOP phase |
| Bits 14, 15 | line status <br> 00 inhibited <br> 01 diagnostic mode <br> 10 modem without data <br> 11 modem and data | Bits 14, 15 | line status idem receive |
| SDLC MODE | | | |
| Bit 9 | character in phase | Bit 9 | change of modem status MC |
| Bit 10 | first bit detected | Bit 10 | first bit detected |
| Bits 11 and 12 | SDLC status <br> 01 first flag <br> 10 abort <br> 11 idle | Bit 11 | underrun condition or BCC count |
| Bit 13 | last line status | Bit 13 | last line status |
| Bits 14, 15 | line status idem S/S mode | Bits 14, 15 | line status idem S/S mode |
| BSC MODE | | | |
| Bit 9 | character in phase | Bit 9 | recall change of modem status |

-continued

| Receive Interface | | Transmit Interface | |
|---|---|---|---|
| Bit 10 | first bit detected | Bits 10 to 15 | idem receive interface |
| Bit 11 | C control mode | | |
| Bit 12 | N normal mode | | |
| Bit 13 | X transparent mode all the characters are considered as data characters | | |
| Bits 14, 15 | line status idem S/S mode | | |

In memory A, the SCF field, byte 0 of half word 1 has the following meaning:

| | RECEIVE INTERFACE | | | TRANSMIT INTERFACE |
|---|---|---|---|---|
| Character service | Bit 8 Bit 9 | End 1 Character service | Bit 9 | Character service |
| Request to device 300 | Bit 10 | Detect character overun | Bit 10 | Detect character overun |
| | Bit 11 | Change of modem status | Bit 11 | Any type of change of modem status |
| | Bit 12 | End 2 | Bit 12 | End of transmission EOT |
| | Bit 13 | End 3 | | | with the following meaning:

| Service Character | End 1 | End 2 | End 3 | |
|---|---|---|---|---|
| 1 | 0 | 0 | 0 | data any protocol |
| 1 | X | 0 | 1 | end 3 detected X = 0 CRC check no error X = 1 CRC check error |
| 1 | 0 | 1 | 1 | end flag out of boundary SDLC |
| 1 | 1 | 0 | 0 | abort (SDLC mode) |
| 1 | 1 | 1 | 0 | idle status (SDLC mode) |
| 1 | X | 0 | 1 | quit normal or transparent BSC mode X = 0 CRC check no error X = 1 CRC check error |
| 1 | 1 | X | 0 | quit BSC control mode X = 0 Pad check no error X = 1 Pad check error |
| 1 | 0 | 1 | 1 | force 3-seconds timer BCS |
| 1 | 1 | 1 | 1 | force timer off |

Figure 7:
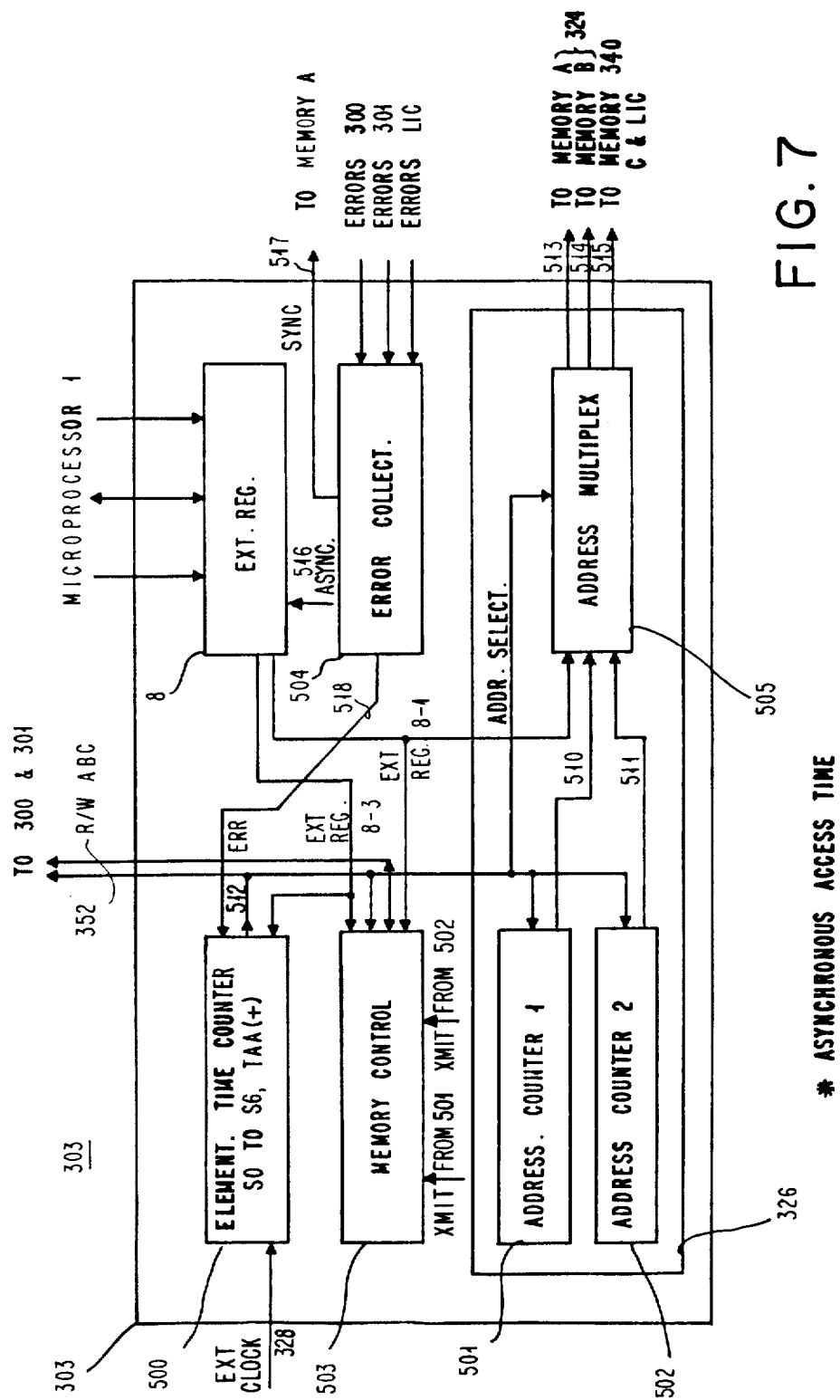
FIG. 7 illustrates addressing and control device 303 of FIG. 3.

The address and control device will be now described while referring to FIG. 7.

It includes external registers 8 as defined with reference to FIG. 3 the function of which is to ensure communication between the microprocessor and the scanning device and address select device 326 in charge of addressing memories A B C and providing the line addresses either during the sequential scanning of these lines or during an asynchronous operation of the microprocessor to access to a memory A, B or C or to a register of the LIC interface circuits.

In addition, device 303 contains a time counter 500 for generating elementary times S0 to S6 in this particular embodiment, from an external clock, these times being used by devices 300 and 301 to clock their operations.

Address select device 326 is synchronous with time counter 500. It contains itself two time counters 501 and 502 which are called "address counters" 1 and 2. Address counter 1 501 generates the scanning addresses provided for device 300 and the LIC interface circuits. These addresses remain stable during the period between S0 and S6 included, said period being assigned to the operation of device 300 on a line interface, then the counter is incremented to be switched to the next interface in accordance with the scanning process described with reference to FIGS. 4 and 5.

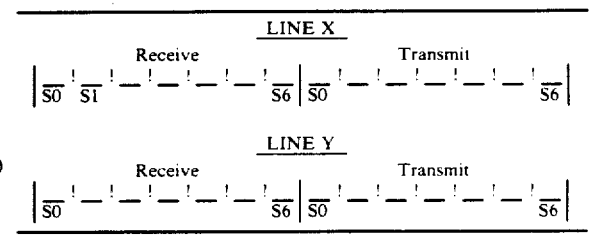

Address counters 2, 502 generate the scanning addresses provided for device 301. These addresses increment exactly as the ones provided by counter 501 but 4 to 8 times slower in function of the operation to be performed by device 301, which means that the addresses of the lines on which devices 300 and 301 operate, are generally different.

From elementary times S0 to S6, device 301 determines operation steps P0 to P3 and the scanning address remains fixed all along these steps in order to allow device 301 to perform its task on a given interface.

After step P3, one comes back to P0 and the counter is incremented to be switched to the next interface which can be the transmit interface of the same line or the receive interface of the next line.

Before starting scanning controlled by the microprocessor, by resetting bit 2 of external registers 8-7 which inhibits scanning as explained above, counters 501 and 502 are set to zero, which means that scanning will begin with address 0 and on the receive interface for each one of devices 300 and 301.

When one of the counters reaches the value of the last address to be scanned, the next increment brings it back to the address of the first line.

The means allowing this operation to be carried out will be described later while referring to FIGS. 9 and 10.

The addresses generated by counters 501 and 502 on address buses 510 and 511 are provided to an address multiplexing device the function of which is to provide the addresses to devices 300 and 301 and to the LIC interface circuits, taking into account elementary times S0 to S6 provided on line 512 by counter 500.

In general, device 300 receives the addresses of counter 501 for its memories B and C and device 301 receives the address of counter 502 for its memory A. But in order to allow a communication to be ensured between devices 300 and 301 on certain fixed elementary times, memory A receives the addresses of counter 501 to allow it to be accessed by device 300 and memory B receives the addresses of counter 502 to allow it to be accessed by device 301.

The addresses provided to memory C and to the LIC interface circuits by device 505 are always the ones of counter 501.

Circuit 505 is provided with three outputs: output 513 for addressing memory A, output 514 for addressing memory B and output 515 for addressing memory C and the LIC circuits.

Address select device 326 is in relation with microprocessor 1 through external register 8-1. When the microprocessor operates in an asynchronous mode to access to a memory or to a LIC circuit, the microprocessor loads the address of the interface on which the operation is to be carried out, into register 8-1. During the execution of the operation, this address is substituted for the addresses of address counters 501 and 502 and is simultaneously delivered to devices 300 and 301 and LIC by address multiplexing circuit 505. The synchronous operation of scanning device 7 is suspended for the duration of the microprocessor operation. Asynchronous access time TAA is generated by the elementary time counter only when the microprocessor performs a read or write operation on a memory A, B, C or on a LIC circuit register. The operation is initiated by the loading of register 8-3 by the microprocessor. Time TAA is intercalated between next encountered time S6 and following time S0. Therefore, it causes a slow down of counters 501 and 502 scanning speed but this speed has been chosen high enough to permit a plurality of accesses without reducing the performance of scanning device 7.

502 according as the error has appeared at the level of device 300 or 301. An error issued from a LIC card will be assigned to the address interface provided by 501 while an error appearing in a cycle steal, belongs to the address interface provided by 502. The errors detected on an internal bus are assigned to device 300 or 301 in function of their use of the bus: more accurately, the errors of this type appearing on time S0, S1 or S2 are assigned to device 301 (address provided by 502) and the errors on the bus appearing on the other synchronous times, are assigned to device 300 (address provided by 501).

If it is assumed that it is possible to have, in the same time, an error in both devices 300 and 301, time TAA is divided in two portions, the first portion being provided for recording the errors of device 301 (address provided by 502), the second portion being provided for recording the errors of device 300 (address provided by 501).

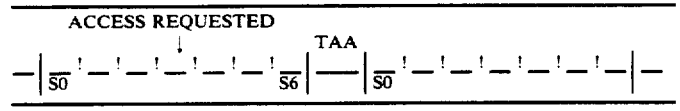

In addition to the line addresses, memories A, B, C receive from device 303, select controls and read and write controls (CTL 352 on FIG. 3) elaborated by the control device of memories 503 in function of elementary times S0 to S6 which define the synchronous operations to be executed by devices 300 and 301, and of XMIT signals which, when at level 1, indicate that the scanned interface is a transmit interface and are elaborated by the address counters.

During time TAA, these controls are issued from the contents of external register 8-3 previously loaded by the microprocessor.

Another element of device 303 is error collect device 504 which is provided to centralize all the error information which can be detected by device 7 and to provide said information to the microprocessor.

There are the errors of the synchronous type detected when working on the lines of devices 300 and 301 and the errors of the asynchronous type appearing when the microprocessor accesses to a memory or to a LIC register on time TAA.

The asynchronous errors are arranged into external register 8-4 through output bus 516 according to the pattern previously described in reference with FIG. 3.

After having controlled an operation, the microprocessor reads register 8-4 to determine whether said operation has been correctly completed or not.

The synchronous errors can be as follows:
error in the LIC card addressed by address counter 501, error in the determination of the address or failure of a line drive circuit,
parity error on an internal bus of scanning device 7,
parity error on the addresses or data generated by device 7 to access to the microprocessor memory in cycle steal mode.

In the scanning device, the synchronous errors are recorded and processed at the level of the line in error. In this way, the work on the other lines is not disturbed. The error information is loaded through bus 517 into memory A, half word 1, byte 1, by device 504 which triggers for this purpose, a time TAA identical to the time defined above for the synchronous accesses.

During time TAA provided for recording the errors, the address of memory A can be address 501 or address This will be explained later by means of a table providing address multiplexing.

Thus during time TAA, memory A can receive two error information, each one corresponding to a different address.

The error information is placed into a byte, bits 6 and 7 of which are set to zero. The error recording mechanism controlling the writting of this byte into memory A, controls in the same time, the writting of this type into memories B and C. In memory B, bit 6 at zero, of half-word 1, byte 1, erases the start bit and in memory C, bits 6 and 7 at zero reset the "line inhibit" bits, half-word 0, byte 1, to zero.

In this way, the line in error is stopped and if new errors are detected on this line, they are not recorded as long as the line is not started again by the microprocessor in order not to disturb the later through multiple error information.

The error information loading operations have priority over the microprocessor operations on the memories and LIC cards. If a synchronous error appears while the microprocessor performs an operation on a memory, next time TAA is provided for processing the error and the microprocessor should wait for a next time TAA.

The following of the error processing is ensured by device 301 when counter 502 reaches the address of the line on which the error has appeared, the error information of memory A is arranged into external register 8-6, the line address is loaded into register 8-5 and an interrupt request is sent to the microprocessor which, then, reads external registers 8-5 and 8-6 to determine the address of the line in error and the cause of the error.

Figure 8:
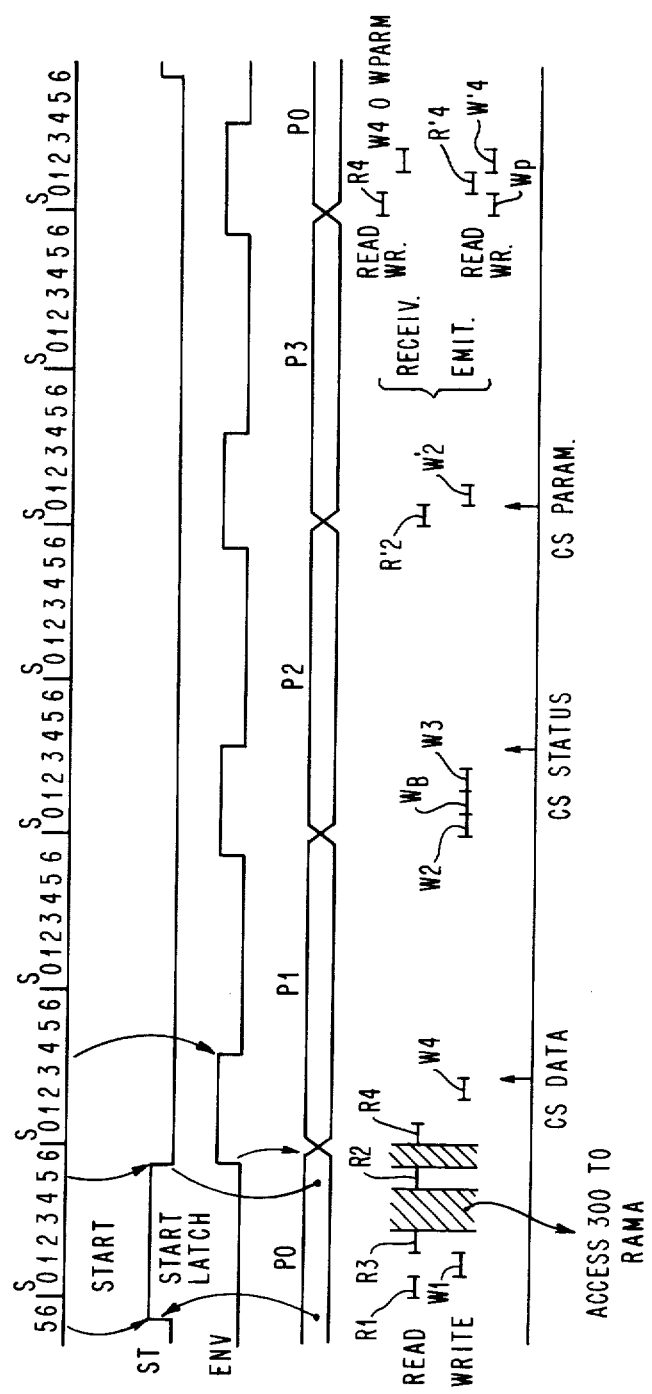
FIG. 8 illustrates the time diagram of device 301.

FIG. 8 shows the time diagram relating to the operation of device 301 which can be repeated up to eight times for each interface scan. First the receive interface is scanned, then the transmit interface.

A start pulse informs the address selector that device 301 is ready to operate.

A so called "Enveloppe ENV" pulse ensures the synchronization after a cycle steal step, with the microprocessor and the discrimination between an operation step in device 301 and an information exchange step with the microprocessor, to be made.

Now, the address counters 501 and 502, respectively, will be described while referring to FIGS. 9 and 10. These two counters are comprised of the same basic elements. Consequently, only counter 501 will be described in details and only the elements of counter 502 which are different will be described. It is assumed that the network configuration comprises eight LIC cards for each adaptor, each one being connected to a maximum of four lines. It is obvious that other configurations could be used. In this case, the number of the stages of the various card and line counters would have to be changed.

Counter 501 comprises a receive/transmit latch 530. When starting the scanning operation, it is set to 0 since the operation begins always by scanning a receive interface. It is reset to zero by the general resetting to zero of the machine. Its status is changed on each pulse S6 provided by the elementary time counter on line 512 (FIG. 7). Therefore, at the end of the scanning operation performed on each interface, its status is changed, it provides a pulse at high level 1 when a transmit interface is scanned, and a pulse at low level 0 when a receive interface is scanned.

Card counter 532 comprises 3 bits C0, C1, C2. C2 being the less significant bit LSB and C0, the most significant bit MSB. The function of this counter is to provide the portion of the address which points out the LIC cards. When LIC cards LIC 0 to LIC 7 are installed, this counter counts up to the 111 binary value to point out the eighth card, then it is automatically reset to 0 on the next incrementation.

It is incremented through AND gate 534 which is set by the output of latch 530 and pulse S6. Thus, it is incremented when the receive and transmit interfaces of a line have been scanned, to address the following card.

When there are less than eight LIC cards installed, the contents of the card counter is automatically limited to the address of the last card installed, through the logic circuit comprising OR circuit 536 and two logic circuits 537 and 538.

Information "last card installed" is coded on three bits: bit 0 at the output of circuit 536, bit 1 at the output of circuit 537 and bit 2 at the output of circuit 538. These bits are coded as follows:

| Bit 0 | Bit 1 | Bit 2 | Last Card Installed |
|---|---|---|---|
| 0 | 0 | 0 | LIC 0 (last card installed) |
| 0 | 0 | 1 | LIC 1 |
| 0 | 1 | 0 | LIC 2 |
| 0 | 1 | 1 | LIC 3 |
| 1 | 0 | 0 | LIC 4 |
| 1 | 0 | 1 | LIC 5 |
| 1 | 1 | 0 | LIC 6 |
| 1 | 1 | 1 | LIC 7 |

It is supposed that card LIC 0 is always present.

Logic circuit 536, 537, 538 uses signal "LIC present" on line 342 of each LIC. This signal is set to a up level through a switch when a LIC is connected to the machine.

OR circuit 536 receives present signals "LIC 7", "LIC 6", "LIC 5", "LIC 4" PRESENT. Therefore, it provides the 0 bit. Circuits 537 and 538 are AND, OR, INVERT (AOI) assemblies. Circuit 537 provides bit 1 at "1" as output signal.

Card LIC 7 is present, or card LIC 6, or card LIC 5 is absent as well as LIC 4, and LIC 3 is present, or card LIC 5 is absent as well as LIC 4 and LIC 2 is present, as schematically shown in circuit 537.

Figure 9:
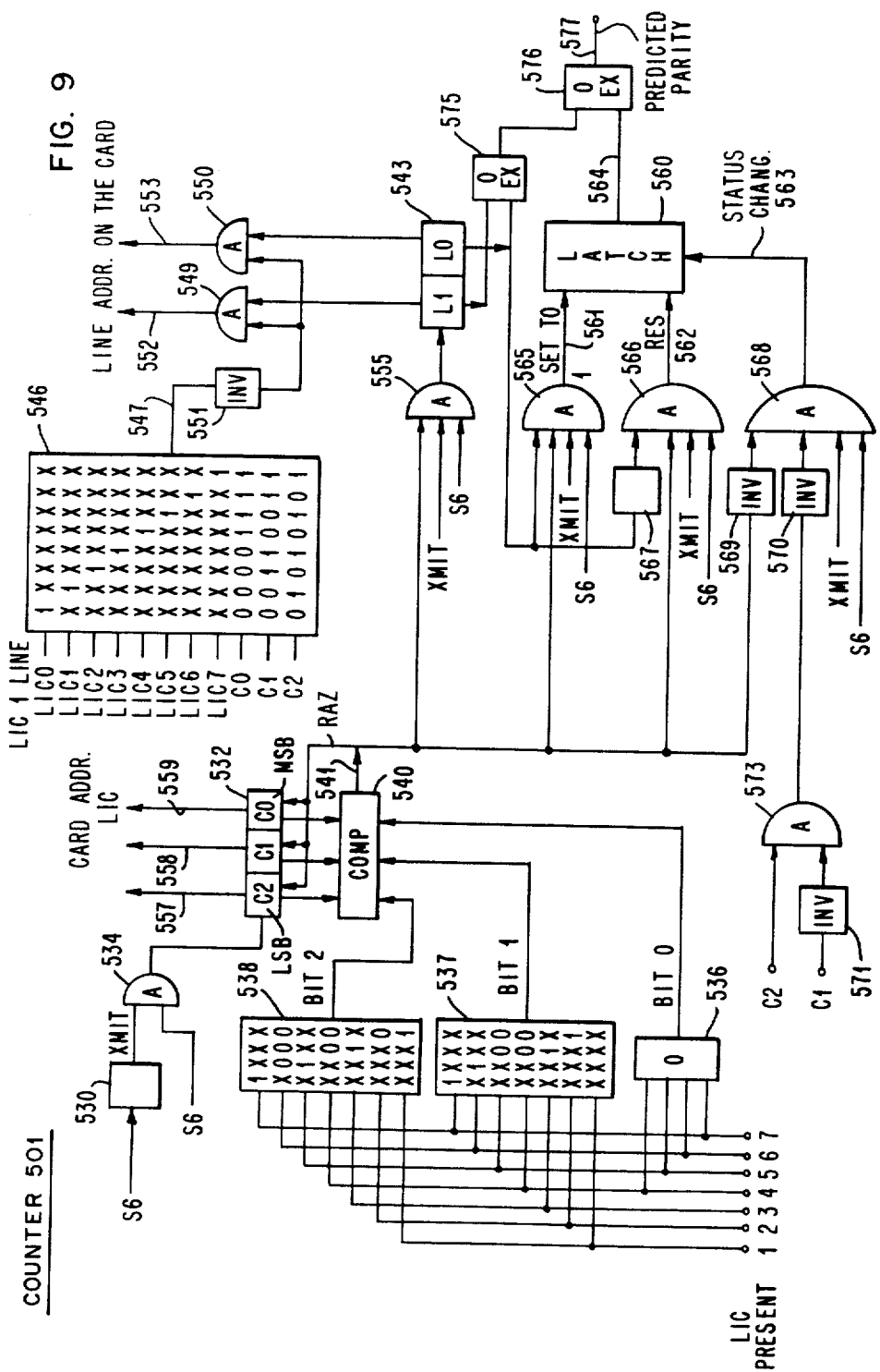
FIG. 9 illustrates line address counter 501 of FIG. 7.
Figure 10:
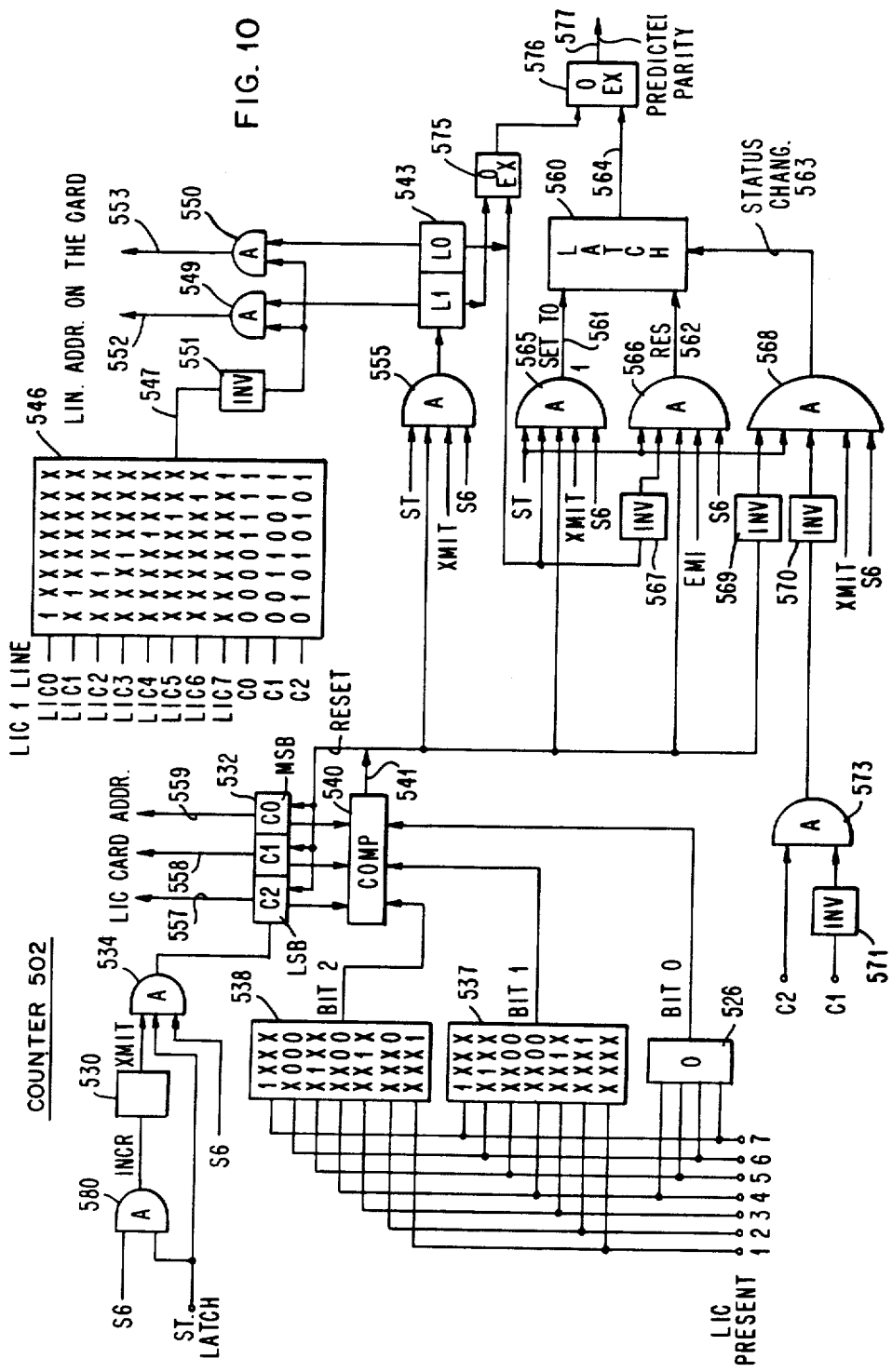
FIG. 10 illustrates address counter 502 of FIG. 7.

In the schematic drawings of FIGS. 9 and 10, X means 1 or 0, i.e. don't care. Circuit 537 ensures an AND operation on the signals of the various columns with the indicated values and a OR operation between the various columns.

Circuit 538 provides bit 2 at "1" as output signal when card LIC 7 is present or LIC 6 is absent and LIC 5 is present, or LIC 6 is absent as well as LIC 4 and LIC 3 is present, or LIC 6 is absent as well as LIC 4 as well as LIC 2 and LIC 1 is present.

The contents of counter 532 is compared to information "last card installed" by comparator 540. When an equality is detected, the comparator generates information "last card scanned" on output line 541.

On next pulse S6, the counter is reset to 0 by its reset control provided by output 541.

Line counter 543 comprises two bits L0 and L1 and provides the portion of the address which points out a line of the card selected by the card counter.

The line counter systematically counts up to the 11 binary value, then it automatically goes back to 00. Thus, it scans the four lines of a LIC card when the latter is not a card "LIC 1 line".

If this card is a "LIC 1 line" as indicated by a signal on line 344 (FIG. 6), the address of this line should be 00.

A logic circuit 546 detects that the scanned card is provided with only one line and generates information "card 1 line" scanned on line 547.

Circuits 546 receives card address information C2, C1, C0 and information "LIC 1 line". It provides a signal at its output 547 at the 1 level, when the scanned card (LIC 0 to LIC 7), the address of which is defined by address bits C2 to C0, comprises only one line. The same references and marks as the ones used for circuits 538 and 537 have been used in this case.

Information "card 1 line scanned" on line 547 is used to erase bits L0 and L1 at the output of line counter 543 by means of AND gates 549 and 550.

The AND gates are set by output 547 inverted by inverter 551. They transmit the contents of counter 543 on output lines "line Address on Card" 552 and 553, when the scanned card is not a card 1 line. In the opposite case, output lines 552 and 553 are at the 0 level.

Line counter 543 is incremented through AND gate 555 set by information "last card scanned" on line 541 and by pulse S6 when output signal XMIT of latch 530 is at the 1 level, which indicates that the scanning of the transmit interface is completed and that we are going to scan the receive interface of the following line.

The assembly comprises a parity prediction circuit which continuously checks the proper operation of the address counter.

This circuit determines, on each incrementation, the value to be taken by the parity of the address bus comprising output lines 557, 558, 559 of counter 532, and lines 552 and 553.

In case of defective operation of the counter leading, for instance, to the generation of an incorrect address bit, the parity calculated from the address bits, will not correspond to the predicted parity and it will be possible to detect the defect. The correct operation of address counter 501 is checked by the LIC circuits in a way to be explained later.

The parity prediction circuit is designed from the following remarks:

| PARITY OF CARD COUNTER 532 (for a given value of the line counter) | | | | |
|---|---|---|---|---|
| C0 | C1 | C2 | P | |
| → 0 | 0 | 0 | 1 | Initial Condition |
| 0 | 0 | 1 | 0 | |
| | | | | ← Parity does not change |
| 0 | 1 | 0 | 0 | |
| 0 | 1 | 1 | 1 | |
| 1 | 0 | 0 | 0 | |
| 1 | 0 | 1 | 1 | |
| | | | | ← Parity does not change |
| 1 | 1 | 0 | 1 | |
| ← 1 | 1 | 1 | 0 | |

On each incrementation, the value of the parity is changed except when C1=0 and C2=1.

| LINE ADDRESS PARITY Card and Line Counters 532 and 543 | | | | | | |
|---|---|---|---|---|---|---|
| L0 | L1 | C1 | C1 | C2 | P | |
| 0 | 0 | 0 | 0 | 0 | 1 | Initital status |
| 0 | 0 | 0 | 0 | 1 | 0 | |
| 0 | 0 | 0 | 1 | 0 | 0 | |
| ↓ | ↓ | | etc | | | |
| 0 | 0 | | Last Card Installed | | | |
| Incrementation | | Resetting to Zero | | | Parity Prediction | |
| 0 | 1 | 0 | 0 | 0 | 0 | |
| 0 | 1 | 0 | 0 | 1 | 1 | |
| ↓ | ↓ | | etc | | | |
| 0 | 1 | | Last Card Installed | | | |
| Incrementation | | Resetting to Zero | | | | |
| 1 | 0 | 0 | 0 | 0 | 0 | |
| 1 | 0 | 0 | 0 | 1 | 1 | |
| ↓ | ↓ | | etc | | | |
| 1 | 0 | | Last Card Installed | | | |
| Incrementation | | | | | | |
| 1 | 1 | 0 | 0 | 0 | 1 | |
| 1 | 1 | 0 | 0 | 1 | 0 | |
| ↓ | ↓ | | etc | | | |
| 1 | 1 | | Last Card Installed Return to Initial Condition | | | |

As shown on the preceding tables, for a given value of the line counter, the value of the parity is changed on each incrementation of the card counter except when C1=0 and C2=1.

When the card counter reaches the value corresponding to the last LIC installed, the next incrementation resets it to 0, increments the line counter and sets the parity to a value depending on the previous condition.

If L0=0, the new parity is 0
If L0=1, the new parity is 1

When the card counter points out a card "1 line", the resetting to zero of the line counter output through AND gates 549 and 550 requires the correction of the predicted parity. In this case:

If L1=L0, the parity is unchanged
If L1≠L0, the parity is inverted.

The parity predict circuit comprises a parity predict latch 560 which can be set to 1 by a signal applied to its input 561 and reset to zero by a signal applied to its input RAZ 562. A signal applied to its input "Status change" 563 causes the condition of its output signal on line 564 to be changed.

When starting the machine, all the counters are reset to zero and the parity latch is set to 1. During the scanning operation, latch 560 is set to 1 by AND circuit 565 which is set when L0=1, when the last card installed is detected (line 541 at 1) when the incrementation is performed (XMIT and S6 at 1).

It is set to 0 by AND circuit 566 which is set when L0=0 through inverter 567, when the last card installed is detected and when the incrementation is performed (XMIT and S6 at 1).

And circuit 568 is gated and during the scanning operation performed on the cards for a given value of the line counter, it is used to prevent the status change of latch 560 from being performed when C1=0 and C2=1. Gate 568 receives as inputs signal "last line scanned" inverted by inverted 569, signals XMIT and S6 and the output inverted by inverter 570, of AND circuit 573 which is set when C2=1 and C1=0. C1 is applied to AND circuit 573 by inverter 571.

Condition L1≠L0 is detected by exclusive OR circuit 575 and the parity detected at output 564, in this case, is inverted by exclusive OR circuit 576.

The parity indication is provided by circuit 576 on its output 577.

Therefore, the logic allows the parity to be predicted during the scanning operation in accordance with the preceding tables.

As shown on FIG. 6, in each LIC, comparator 590 receives, on the one hand, the address of LIC C0, C1, C2 and on the other hand, the wired address of the LIC. Decode circuit 591 receives ligne address L0, L1.

The valid signals are at the 1 level in the following conditions:

| L0 | L1 | VALIDATION |
|---|---|---|
| 0 | 0 | VAL LI.0 |
| 0 | 1 | VAL LI.1 |
| 1 | 0 | VAL LI.2 |
| 1 | 1 | VAL LI.3 |

Counter 502 comprises the same elements as counter 501. Therefore, it is shown on FIG. 10 with the same elements bearing the same references. The increment circuit is modified.

Receive/transmit latch 530 which, in the initial condition, is at 0, is incremented when starting pulse ST is at the high level, at time S6, through AND circuit 580.

AND gate 534 is set by the starting pulse, S6 and XMIT. An additional condition is added to AND gates 565, 566 and 568, namely ST=1.

Thus, the address provided by counter 502 and used for addressing memory A in device 301 is incremented slower than the address provided by counter 501, since the incrementation of counter 502 is controlled by starting pulse ST.

The parity of address counter 502 is checked when the later is transferred to external register 8-5, then read by the microprocessor following an interrupt.

The address multiplexing circuit of FIG. 7 receives the addresses generated by address counters 501 and 502, pulses S0 to S6 and TAA through select line 518, and the addresses stored in the external registers for the asynchronous operation. It enables the address information to be directed to output lines 513, 514 and 515 in accordance with the following table. It is comprised of a set of AND and OR gates which are set on the appropriate times to let the appropriate address signals to go through.

control of the microprocessor, device 300 sends this pattern to the modem to change the modem-in

LINE ADDRESS MULTIPLEXING
In function of the operations and elementary times

|  | Synchronous Operation | | | Asynchronous Access | Synchronous Error Recording Times TAA | |
| --- | --- | --- | --- | --- | --- | --- |
|  | S0, S2 S5 | S1 | S3, S4 S6 | Times TAA | First Portion | Second Portion |
| Output 513 |  |  |  |  |  |  |
| Line address to MEM A | Address 502 | Address 502 | Address 501 | Register 8-1 | Address 502 | Address 501 |
| Output 514 |  |  |  |  |  |  |
| Line address to MEM B | Address 501 | Address 502 | Address 501 | Register 8-1 | Address 502 | Address 501 |
| Output 515 |  |  |  |  |  |  |
| Line address to MEM C and LICs | Address 501 | Address 501 | Address 501 | Register 8-1 | Address 502 | Address 501 |

Device 300 insure the link control at bit level and the connection with device 301.

Therefore, its functions consist in:
assembling the received bits into characters
disassembling the characters to be transmitted into bits
managing the line by using the "modem-in", "modem-out" patterns
supporting at least the following line protocols:
  start-stop S/S with a start code bit, 5 to 8 information bits, 1 or 2 stop code bits, inserting and cancelling start and stop code bits,
  BSC in EBCDIC or ASCII, normal or transparent mode with management of error controls CRC, VRC, LRC, recognition of the control characters, insertion and cancellation of the synchronization characters, time counter support,
  SDLC with management of control character CRC, insertion and cancellation of the 0-bit, detection of the flags, aborts and idle status,
  line interface support.

The line information required for processing a receive or transmit interface is located in the set mode parameters stored into memory C in asynchronous mode, the meaning of which has been previously given.

The information used for managing the characters is formed and stored into the control fields of memories B and C which have been previously defined. The information is as follows:
a bit counter for assembling the characters
the first bit of a character
the character being deserialized or serialized
the line status (normal, diagnostic, etc.)
a character detection
the detection of a change in the status of the modem control wires (any difference between the beginning and the end of the transmission)
the detection of a character underun or overun (these indications indicate that devices 300 and 301 are dissynchronized, i.e. that device 301 has not serviced device 300 on time or that the microprocessor has not read the characters in memory A
CRC accumulation
the modem management: modem-out pattern:
it is sent to the modem when the line is in the modem or modem plus data status; stacked modem-out pattern; at the end of the transmissions under the pattern status thereof: it is compared with the one issued from the LIC circuit possibly under the control of a mask pattern.

As previously indicated, memories B and C have been assigned to the execution of these functions, these two memories being able to be used in parallel for optimizing the performance.

An embodiment of circuit 308 will be described in the following while referring to FIGS. 11, 12, 13 and 14. This circuit consists in a logic assembly which mainly includes registers REG, increment circuits INC, a comparator COMP, latches L, AND gates shown as half-circles with a A. This circuit is controlled by pulses S0 to S6 issued from counter 500 (FIG. 7).

Figure 11:
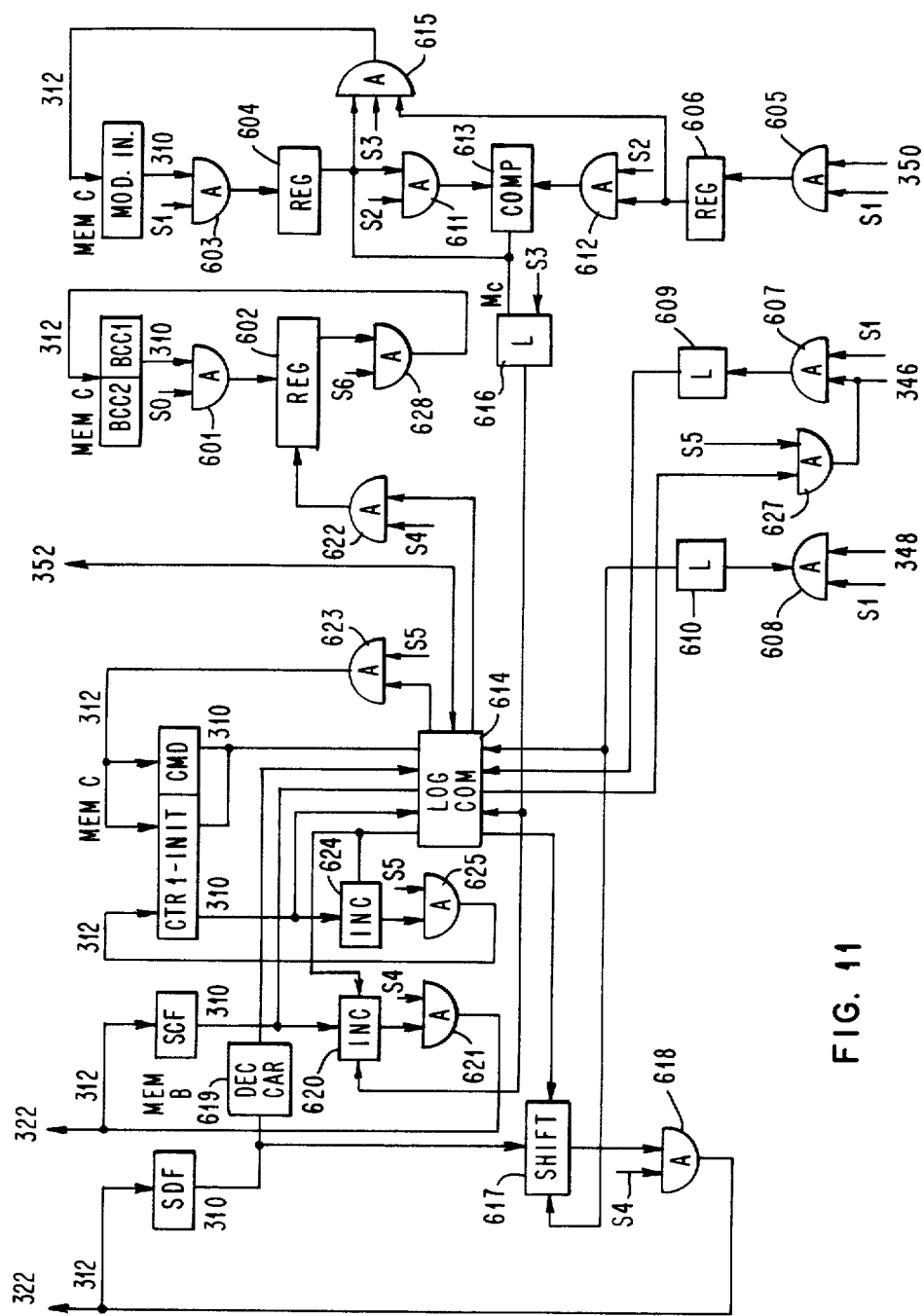
FIG. 11 illustrates the various elements of monitoring logic circuit 300 of FIG. 3, used in receive mode.
Figure 12:
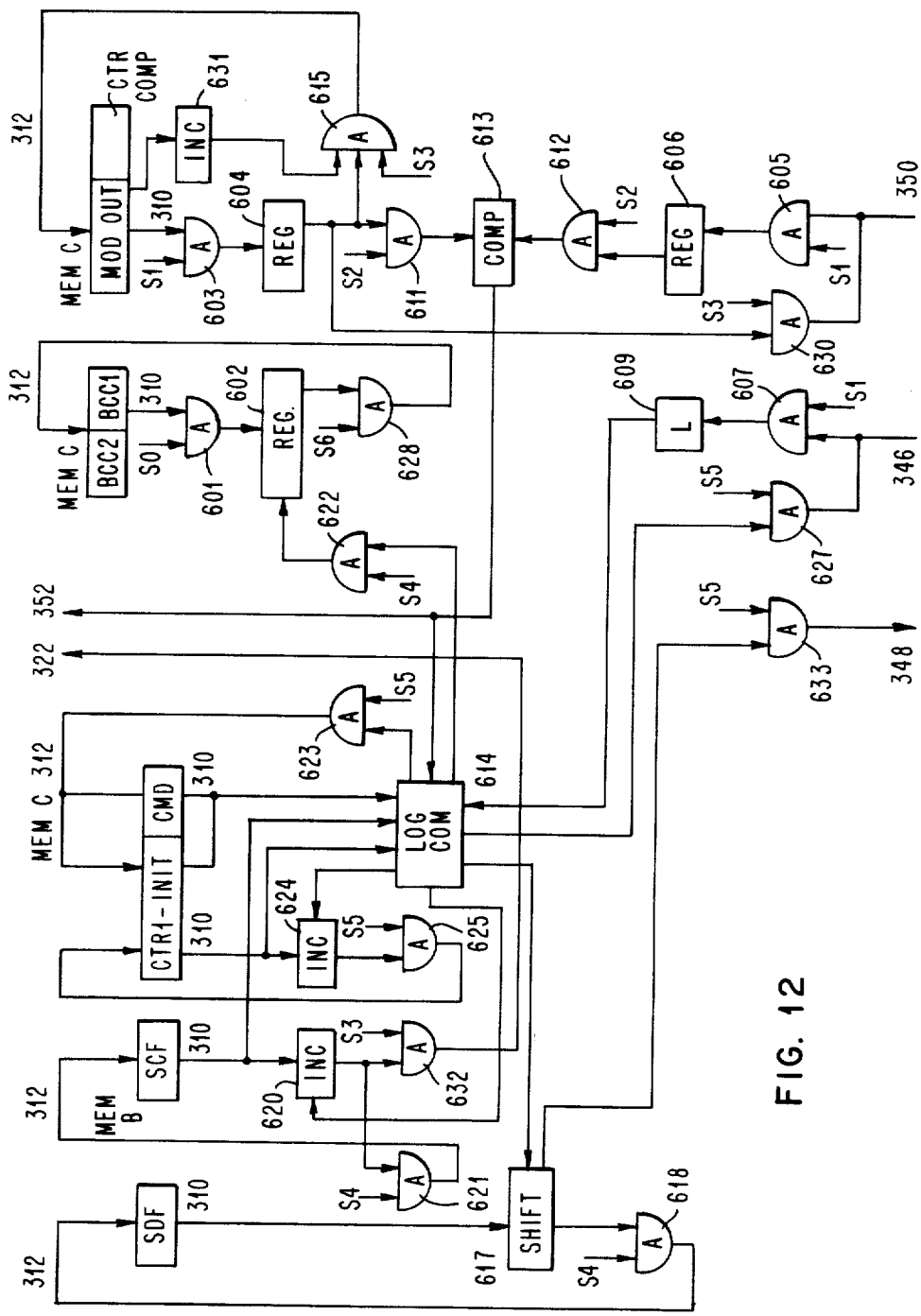
FIG. 12 illustrates the elements of monitoring logic circuit 308 used in transmit mode.

FIG. 11 shows the elements used for scanning a reveice interface addressed by the address control and select device. The elements used for scanning a transmit interface are shown on FIG. 12. Of course, they are the same ones but actuated in a different way.

FIG. 11 shows the SDF and SCF fields of memory B which are addressed for scanning a receive interface, set mode field INIT which, more particularly in mode SDLC, contains three bits CRT1 used as a 1-counter, command field CMD, fields BCC1 and BCC2 and modem-in pattern MOD IN of memory C. It is assumed that the interface receives SDLC data.

On time S0 of the time interval provided for scanning the interface, the contents of half-word BCC1/BCC2 is transferred to register 602 through AND gate 601 set by S0.

On time S1, the contents of half-word MOD IN is transferred to register 604 through AND gate 603 set by S1. In the same time, the contents of modem-in register 408.2 in the corresponding LIC circuit, is transferred to register 606 through bus 350 and AND gate 605 and the contents of latches 412-2 (service bit) and 410-2 (data bit) on wires 346 and 348 are transferred to latches 609 and 610 through AND gates 607 and 608.

On time S2, the contents of registers 604 and 606 are sent to comparator 613 through AND gates 611 and 612.

The contents of half-words SDF/SCF and INIT/CMD are read and remain available at the memory output up to the end of the interface scanning, as schematically shown on FIG. 11.

On time S3, if the comparator indicates that the two patterns are different, the contents of register 606 is re-written into the modem-in area through AND gate 615 and modem status-change information MC is loaded into latch 616. If the patterns are the same ones, there is not re-writting, the modem-in byte remains unchanged.

On time S4, byte SDF which is in shift register 617, is shifted to the right and the bit received from latch 610 is added through the input of the shift register and the byte is re-written into the memory through AND gate 618 into the SDF field.

This is executed under the control of control logic LC 614 which determines whether the shift should be performed or not. When there is no more service-bit information in latch 609, i.e. there is no new bit received from the modem, there is no shift. In the same way, the shift is cancelled for deleting the zeroes in protocols SDLC or for inserting start and stop bits, which is indicated in the set mode parameter by the 1-bit counting portion in mode SDLC. In effect, a zero should be delected each time five 1-bits are received.

If the command logic detects through the bit counter contained in the SCF, that a complete character has been serialized, the complete character information is transmitted to the address selector, line 352, to indicate that the character received at processor 301 is to be transferred and that memory A is to be addressed.

Byte SDF is then re-written not into memory B through bus 312 but into memory A, then addressed by the address selector in the new PDF area of the interface.

During said time S4, byte SCF is modified as necessary: the bit counter is incremented; modem status change bit MC is added or the bits indicating the reception of special characters decoded by circuit DEC CAR 619 in protocols SDLC or BCS, are added through increment circuit INC 620 and AND gate 621.

The byte is re-written into the SCF area of memory B if the character is not complete or into the SCF area of memory A if the character is complete.

On time S4, the contents of register 602 is modified under the control of AND gate 622, in accordance with the calculation mode of error code CRC in use. This calculation will be described later while referring to FIG. 14.

On time S5, half-word INIT/CMD is re-written by modifying the bits if necessary, when the control logic detects, for instance, that the character was in phase, i.e. that in mode SDLC for instance, five ones have been received and followed by a zero or that the end of the character has been detected. This is ensured by AND gate 623. The 1-counter located in byte INIT is incremented prior to re-writting, by increment circuit 624 and AND gate 625 if the received bit is a 1. The counter is reset to zero if the received bit is a 0.

The reset command of latch 412-2 is sent by control logic 614 and AND gate 627, which means that the bit has been received and processed.

On time S6, the modified contents of register 602 is re-written into area BCC1/BCC2 through AND gate 628.

In transmit mode, the following operations are performed. They will be described while referring to FIG. 12.

On time S0, the contents of half-word BCC2/BCC1 is transferred into register 602. Half-word SDF/SCF is read. The "modem-out sent" bit of this half-word (bit 15) is sent by the control logic to the address selector (line 352). This bit, when it is present, allows the "modem-out stacked" pattern halfword to be read instead of the "modem-out immediat" pattern half-word.

On time S1, the contents of "modem-out stacked" or "immediate" byte MOD OUT, is transferred into register 604 through AND gate 603. The contents of the "modem-out" register of the interface circuit, is transferred into register 606. The contents of service-bit latch 412-1 of the LIC circuit is transferred into latch 609 through AND gate 607.

On time S2, the contents of registers 604 and 606 are sent to comparator 613. The comparison is performed when counter CTR COMP in pattern MOD OUT is set to 11, since it is not necessary to perfom this comparison on each cycle but only every fourth cycles.

In the case of inequality, the "check drive circuit" control information is sent to the address selector 326 (line 352).

Half-words INIT/CMD and SDF/SCF are read, which allows control logic 614 to define the operations to be performed on next time.

On time S3, the contents of register 604 is sent to the register of the LIC circuit of the scanned interface, through AND gate 630, and re-written into the modem-out byte after the incrementation of compare counter CTR COMP by circuit 631 and AND gate 615.

If the control logic detects the beginning of a character: bit 2 of byte CMD at 1, said logic indicates this detection to the address selector through line 352 which, then, allows byte SCF to be written into memory A through AND gate 632 and bus 322. If the control logic does not detect the beginning of a character, half-word SDF/SCF is read.

On time S4, the character contained in byte SDF is shifted by one bit to the right by shift register 617 and AND gate 618 and re-written into memory.

Byte SCF is updated by incrementing the bit counter in this field by circuit INC 620, and it is re-written into memory B through AND gate 621.

On time S5, half-word INIT/CMD is updated and re-written through AND gate 623.

The R.H. bit of byte SDF is sent to the LIC circuit by AND gate 633 as well as the reset command of latch 412-1 indicating that the bit has been sent.

On time S6, half-word BCC2/BCC1 is re-written after its modification on time S4.

The control logic consists in AND and OR gates which allow the different operations to be successively executed in function of the information contained in the SCF control fields, initiate parameters, control parameters and of the information bits received or to be sent.

Knowing the transmit protocols, this control logic can be realized by the man skilled in the art to allow the above described operations to be executed.

The AND gates which are only used for one of the receive or transmit operations, are set by the signals indicating the type of the scanned interface, issued from the address selector 326, through latch 530.

Figure 13:
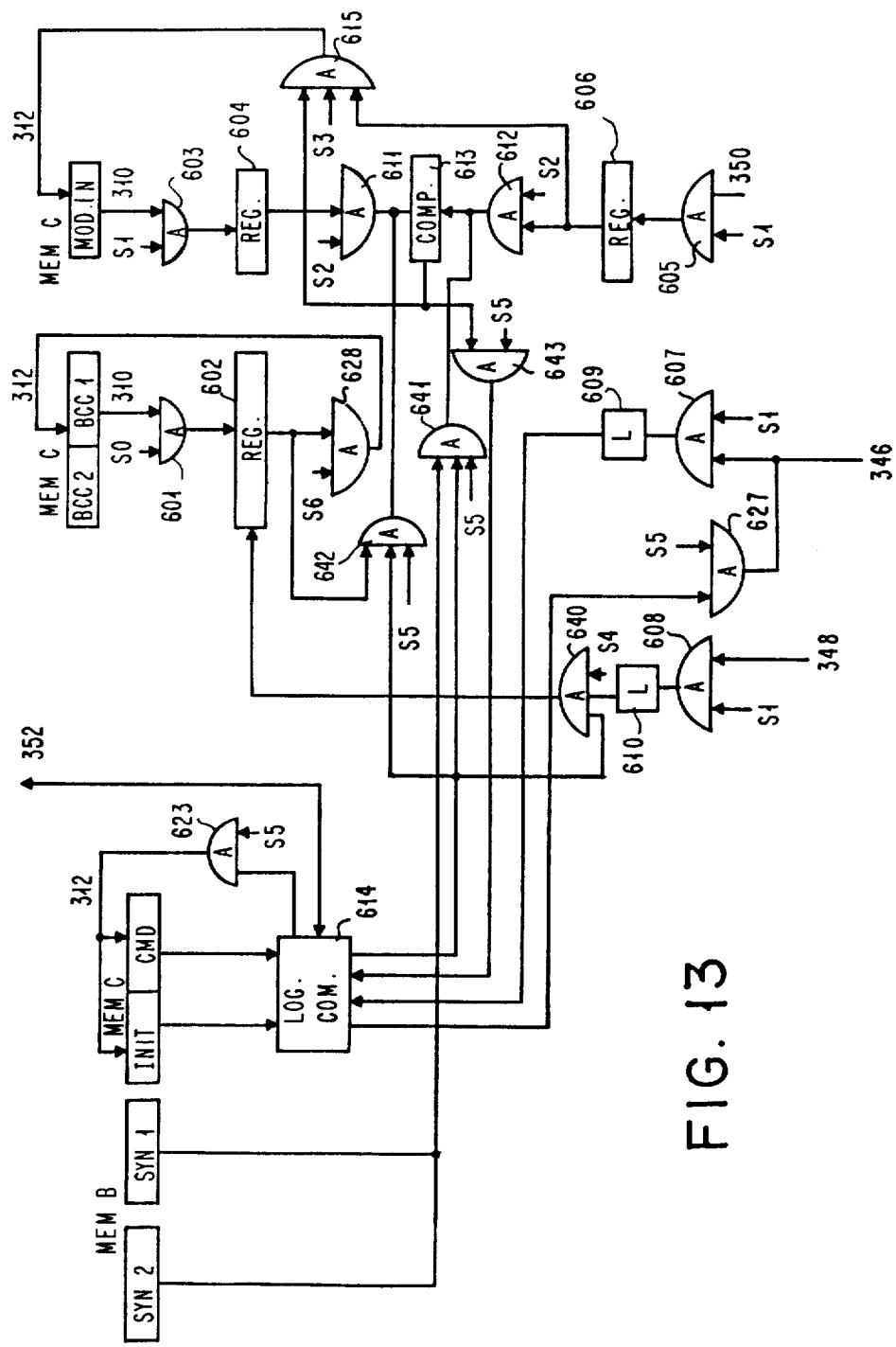
FIG. 13 illustrates the elements of monitoring logic circuit 308 used for fetching the synchronization patterns.
Figure 14:
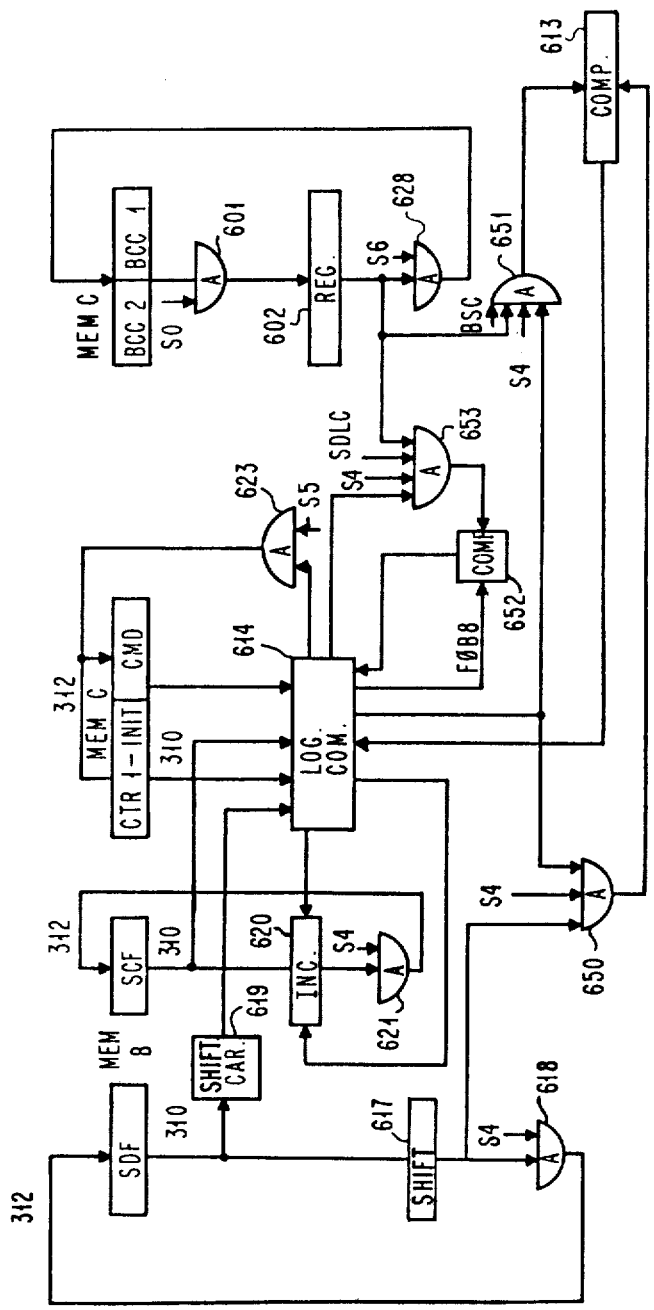
FIG. 14 illustrates the elements of monitoring logic circuit 308 used for verifying the CRC.

The operations more particularly executed in accordance with the various protocols will be described in the following while referring to FIG. 13.

PROTOCOL BSC

The synchro search in this protocol in receive mode, is performed by defining a pattern of 16 consecutive bits. This pattern is placed by the microcode in asynchronous mode into memory B: Synchro 1, Synchro 2, half-word 4, during the set mode phase. In half-word INIT/CMD, bit 9 indicates that this pattern has been found.

When starting to scan a line, the control logic checks whether this bit is present or not. If it is not present, the data bit received from the line is sent into shift register 602 on time S4 through AND gate 640. On time S4, control logic 614 indicates through line 352, that half word SYN 2/SYN 1 is to be read from memory B.

On time S5, this half-word is sent to the comparator through AND gate 641 as well as the contents of register 602 through AND gate 642.

If there is no equality, the contents of register 602 is re-written into half word BCC2/BCC1 on time S6 as described above.

When the line is scanned again, half word BCC2/BCC1 is placed, on time S0, into register 602. On time S4, a new bit is added and a new comparison is performed.

When an equality is detected, the control logic places into control byte CMD, the in-phase character bit on time S5 under the control of AND gate 643. On time S6, the contents of register 602 is written into half word BCC2/BCC1 and the register is erased. Thus, half word BCC2/BCC1 is ready for the calculation of the CRC.

During the following scan, the normal operation of the control logic detecting the "character in phase" bit resumes for assembling the characters into the SDF field as described above.

When the control logic decodes an end-of-message character in the SDF field, it re-writes the control byte by erasing the "character-in-phase" bit. By re-writting the SCF field on time S4, the control logic adds bits "end 1" to "end 3" to indicate to the microcode what type of "end of message" has been received.

Then, one is ready for receiving another message.

In transmit mode, in order to insert timing characters into the message, device 301 does not supply device 300 with characters. The later detects this lack of characters as follows.

When device 300 has taken the character from the PDF field on time S3, field SCF which is written into memory A through AND gate 632 (FIG. 12) includes a "service character" bit. This field SCF is also written into byte PCF in memory B. When device 301 writes another character to be transmitted into half word PDF/PCF (of memory B), it erases the "service character" bit in field PCF.

When device 300 has to take this new character, the control logic checks whether the "service character" bit is present or not in field PCF. If this bit is absent, this means that a character to be sent is present in field PDF. If this bit is present, this means that there is no character to be sent in field PDF of memory B.

Control logic 614 check on each scan, the contents of the bit counter contained in field SCF. When this counter contains 111, this means that the character bits have been sent. On time S5, the control logic re-writes field CMD with the "first bit detected" bit which is present.

During the next scan, when the control logic detects this bit, it controls the reading of field PDF if the "service character" bit is not present in field PCF or of synchro byte SYN if this bit is present and if bit X is absent from the control byte, or of byte "DLE" if the "service character" bit is present in the PCF and if bit X is present in the control byte. In the last two cases, the "lack of character" bit is re-written into the control byte. This bit allows a second synchro character to be sent. Bit "X" which means "transparent mode" is written into the control byte when the character taken from the PDF is a start character in transparent mode. It is erased when a character indicating an end of transparent mode is decoded.

PROTOCOL SDLC

In protocol SDLC, a zero is inserted into the data bits each time five consecutive ones have been emitted, in order not to confound the data with the following patterns:

Flag: 01111110
Abort: 01111111
Idle status: 0111111111111111 used as control characters.

For executing this insertion, 3 bits of byte INIT are used to count the successive ones sent on line.

When the control logic detects that this counter is at 5, if the "no insert zero" bit is not present in the SCF, the logic stops the shift of field SDF. Therefore, a zero is sent on line and the bit counter is not incremented.

In receive mode, when the control logic detects that the 1-counter is at 5 and that the bit received is a zero, it stops the shift. Therefore, the 0 bit received is not assembled.

In receive mode, the flag, abort, idle status pattern are detected as follows. When the control logic detects that the 1-counter is at 6, if the bit received is a zero, it detects the flag pattern. If it is a 1, it detects the abort pattern if the "abort" bit is not in the control byte or the inactive status pattern if the abort bit is present. Then the control logic places the corresponding combination of the end bits into the SCF.

START/STOP PROTOCOL S/S

In this protocol, bits 6 and 7 of field INIT are not used any longer for counting ones, but indicate the character length.

When the control logic detects the beginning of a character, the "first bit detected" bit being present in the control byte, it stops the shift, which causes a zero to be sent on the "start bit" line. When the control logic detects the end of a character (bit count in field SCF=length of the character indicated in the initiate field), it writes the "phase STOP" bit into the control byte.

During the next scan, the control logic detects this bit and stop the shift and forces a 1 on line. If the "stop code length" bit is at 0 in byte INIT, the "phase STOP" bit is erased from the control bit. If the "stop code length" bit is at 1, the "phase STOP" bit is not erased and the bit counter is incremented. During the next scan, when the bit counter is at 1, the control logic sends again a 1 on line, it erases the "phase STOP" bit and sets the "first bit detected" bit to 1.

On the next scan, the sequence is started again.

In receive mode, the first 0-bit received is considered as a start bit. The control logic writes the "character in phase" bit into control byte CMD. This 0-bit is not accumulated.

During the next scan, when the "character in phase" bit is present, the control logic accumulates the bits received until the bit counter is equal to the character length; At this time, the "phase STOP" bit is written. During the next scan, the control logic detects that this bit is present, it stops the shift, checks that the bit received is a 1, the "stop code" bit, and erases the "character in phase" bit. If the bit received is not a 1, the control logic writes the combination of the end bits meaning "stopcheck" into byte SCF.

The "character in phase" bit being erased, one waits for the reception of a next bit of the start code (0) to restart the sequence.

Line 14 shows how logic 308 of circuit 300 is used to check the CRC in mode BSC and in mode SDLC.

MODE BSC

In protocol BSC, the CRC is checked by comparing byte by byte the CRC received from the emitter with the CRC recalculated on reception. When control logic 614 detects through character decode circuit DEC CAR 619 that the character received is an end-of-message character, it writes bits X and N to 1 into the control byte. Thus, control logic 614 knows, on the next scans, that the character being received is the first byte of the CRC.

At the end of the reception of this character, bit counter CTR1=111, on time S4, shifted field SDF is re-written through AND circuit 618 and sent to the comparator through AND gate 650 set by the control logic and S4. In the same time, byte 1 of register 602 where the CRC is calculated on reception, will also be sent to comparator COMP 613 through AND gate 651 set by the control logic, through S4, and the BSC mode indicating signal.

If there is an equality, the first byte of the CRC is good. If there is no equality, control logic 614 writes bit C to 1 into the control byte. Also, it writes bit D of byte INIT to 1.

On the next scan, detecting bits D, N and X at 1, the control logic knows that the character being received is the second byte of the CRC.

At the end of the reception of this character on time S4, field SDF and byte 1 of register 602 are sent to the comparator. On time s5, bits C, D, N and X are written to 0.

If bit C is at 1 or if the comparison is not good, on time S4, the control logic writes the combination of end bits E1, E2, E3 into the SCF, indicating "CRC error" through AND gate 621.

PROTOCOL SDLC

In this protocol, when the control logic detects an end flag, bit CP (character in phase) at 1 in the control byte, 1-counter at 110, bit received at 0, the contents of register 602 is compared with hexadecimal value F0B8 on time S4 through comparator COMP 642 and AND gate 653 which is set by the control logic, bit CP=1, CRT1=110 and bit received=0, through the indication of mode SDLC and through S4.

According to the result of this comparison, the control logic writes, the end bits corresponding to "check CRC no error" or "check CRC error" into the SCF.

Device 301 allows the control data and information (control parameter and status information) to be exchanged at the byte (8 bits) or half-word (16 bits) level between the control memory which can be also accessed by the microprocessor and device 300 which ensures the data link control at the bit level.

Therefore, its function consists in acting as an interface with the microprocessor through the asynchronous path: set mode phase and also through the synchronous path: cycle steal operation.

It controls the microprocessor interrupts in order to manage the errors and the areas of the microprocessor memory assigned to the interfaces.

It contains the address information for addressing the microprocessor memory in order to write and read this memory when operating in cycle steal mode.

For each line, it brings the assistance of the time counter in byte 1 CTR TPS of half-word 4 of memory A.

The various tasks to be carried out are as follows:
acquiring all the information relating to the interface in memory A,
resetting field SCF relating to a well determined character in order to avoid to make the same job two times,
updating the information in the control paramters by taking the information received in control field SCF, into account,
storing character NPDF received into field SPDF so that two characters are available since the communication with device 300 is performed by characters while the communication with the microprocessor is performed by half words,
managing the exchange of information with device 300,
updating address field SA,
processing operation interrupts and errors,
incrementing time counter CTR IPS if necessary,
transfering received half-words to the microprocessor in cycle steal mode,
writting a control half-word,
in the microprocessor memory, inputting information relative to the status of the four half-words transferred for indicating the events which may have taken place during the data transfer. The format of the status information will be given later on:
transferring a microprocessor control half word for the next exchange of character and writting· this half word into memory A in the place of the former control parameters.

| Definition of the Status Information Field | |
| --- | --- |
| | "Transmit" interface |
| Bit 0 | = 1, Burst valid. This bit means that the data contained in the burst have been sent and that the burst can be re-used by the control microcode to put other data. |
| Bit 2 | An interrupt has been required by the control code (through parameters) |
| Bits 5, 6,7 | Transmitted data count |
| Bit 9 and | 10 Normal service |
| Bit 10 | 11 underrun |
| Bit 11 | Change of the "Modem-in" register contents. This bit indicates that the contents of the "modem-in" register has changed when processing this burst. A status information is immediately sent and an interrupt is immediately requested. |
| Bit 12 | = EOT (End of transmission. This bit is set to 1 when scan device 7 has processed a burst with an end of message information (EOM) in the corresponding parameter field. "Receive" interface |
| Bit 0 | Valid burst Scan device 7 sets this bit to 1 when the status information is transferred in cycle steal mode in order to inform the control code that the associated burst has been filled up. The data can be used by the control microcode. |
| Bit 2 | An interrupt has been requested by the control code through control parameters. |
| Bits 5, | Count of the data received in this burst. |

-continued

| Definition of the Status Information Field | | |
|---|---|---|
| 6, 7 Bits 8, 12, 13 | If 000 if 001 | intermediate data end of reception without check error CRC. |
| | 101 | end of reception with check error CRC. |
| | 011 | flag out of boundary |
| | 100 | abort (the message in progress is bad, do not take it into account). |
| | 110 | idle status (the line has been reset in rest condition). |
| Bits 9, 10 | If 10 if 11 | Normal service overrun |

The operation of device 301 can be divided into seven elementary periods S0 to S6 of 200 ns which can be repeated up to eight times during each interface scan as shown on the time diagram of FIG. 8.

As said above, for each line, the receive interface is scanned in the first time, then the transmit interface.

The work of device 301 on each scan can be divided into five phases. During three of these phases, accesses in cycle steal mode are executed with the microprocessor memory. Therefore, these phases are of variable durations.

Figures 15, 15A:
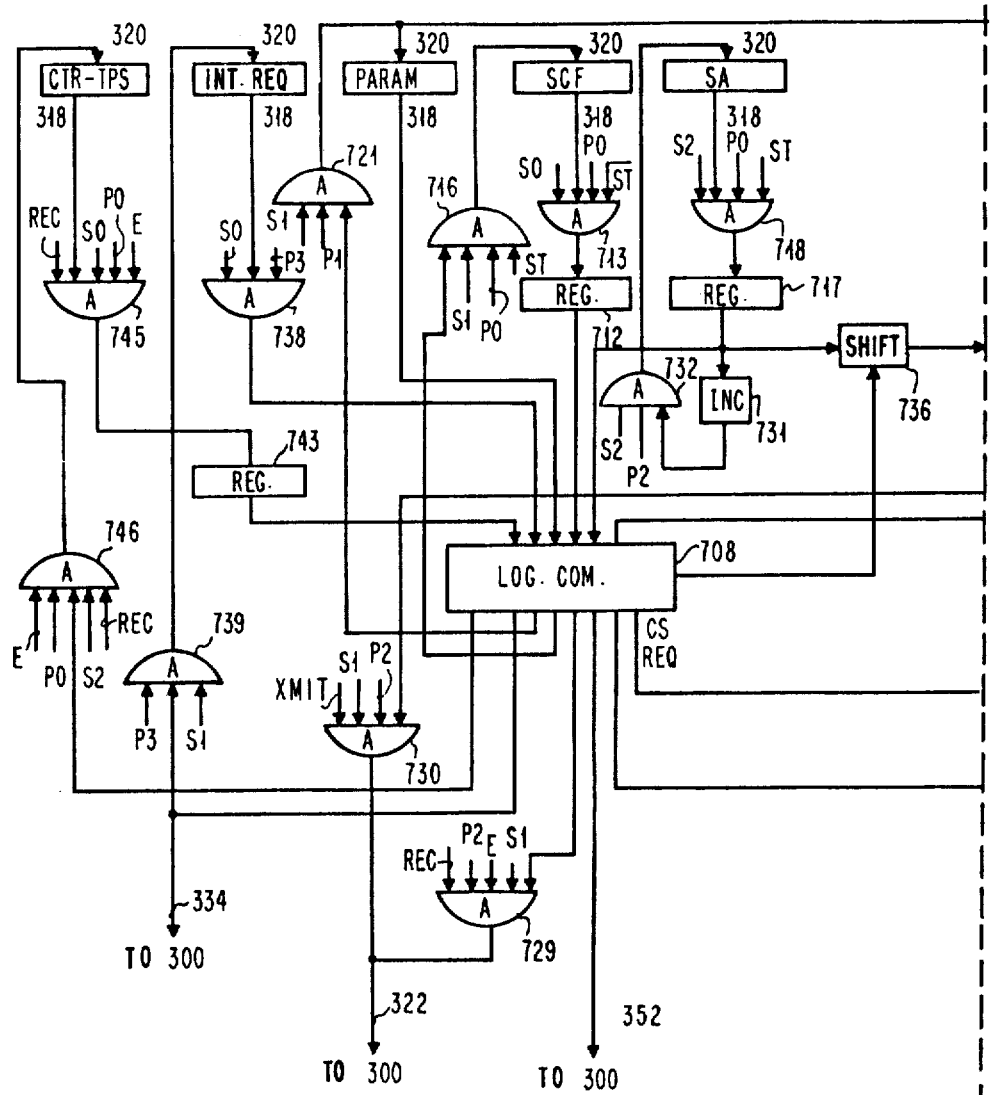
FIG. 15 shows how FIGS. 15A and 15B should be put together to illustrate monitoring logic circuit 316 of circuit 301 shown on FIG. 3.
Figure 15B:
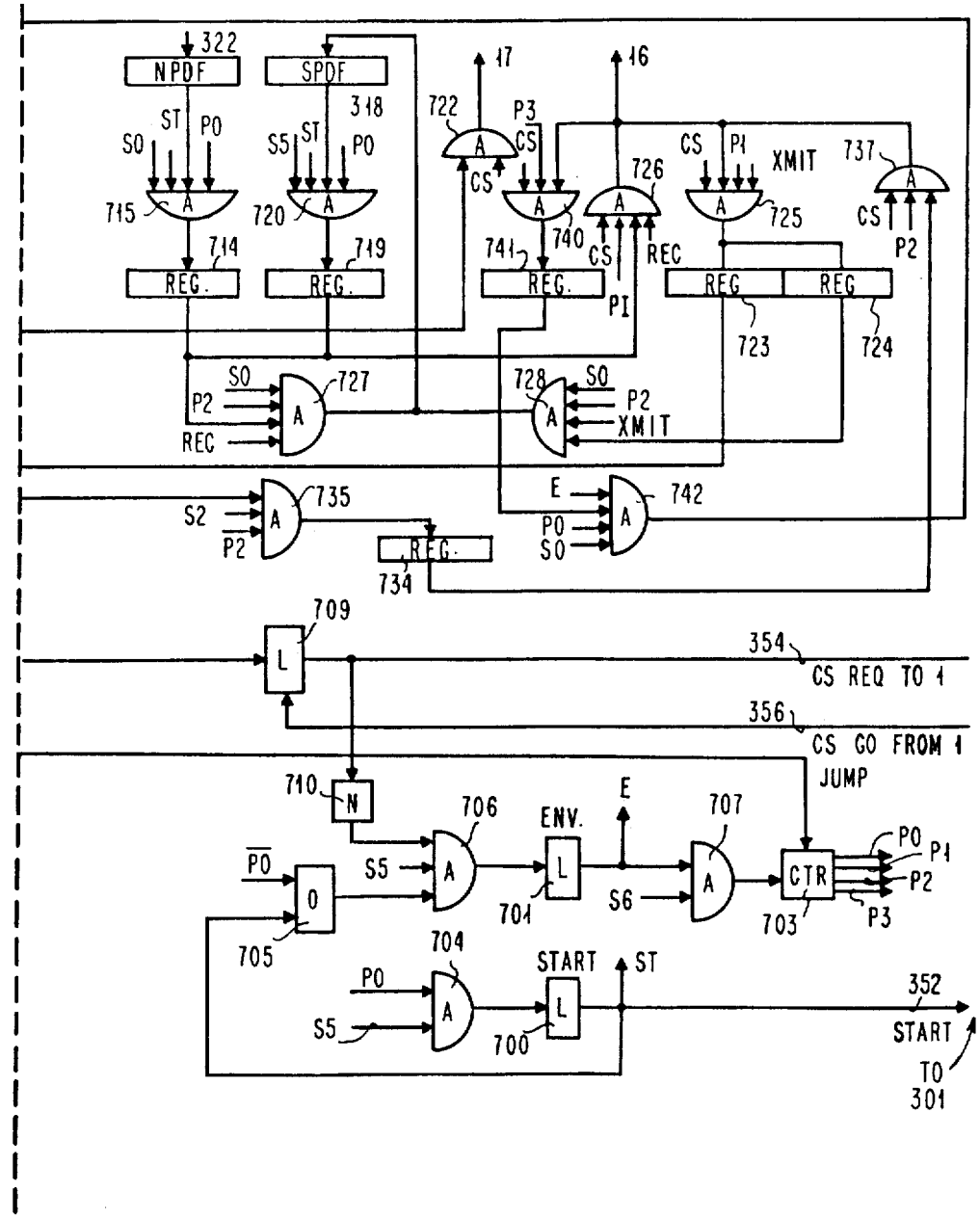

A detailed scheme of logic 316 is shown on FIG. 15.

Counting the work phases is ensured by means of latches 700 and 701 which consist in JK latches of the master-slave type and of counter CTR 703. Counter 703 is provided with four outputs used to define work periods P0, P1, P2, P3 (FIG. 8).

When the counter is set to 00 (phase P0) on time S5, latch START L700 is set by AND gate 704. This latch indicates to the address selector 326 through wire 352 that device 301 is ready to work on a new interface.

On next time S0, a new address is sent to memory A by the address selector 326.

On next time S5, latch 701 so called ENVELOPE, is set through OR gate 705 and AND gate 706.

On next time S6, counter CTR 703 is incremented through AND gate 707. Latch 701 is reset to zero on time S3.

During this phase, control logic 708 can decide to initiate a cycle steal phase CS REQ.

Then cycle steal request latch 709 is set and the cycle steal request control signal is sent to the microprocessor through line 354.

At the end of the stolen cycle, the microprocessor resets latch 709 to zero by applying an end-of-cycle signal CS GO on line 356.

As long as latch 709 is set, latch L 701 cannot be set through inverter N 710 and AND gate 706.

As soon as latch 709 is reset to zero, on next time S5, latch 701 is set, which increments counter 703 to 2 (phase P2).

On time S3, latch 701 is reset to zero.

During this phase, a cycle steal period can elapsed. On time S5, when latch 709 is set at zero, latch 701 is again set and counter CTR 703 goes to 3 (phase P3). During this period, a cycle steal period can also elapsed. On time S3, latch 701 is reset to zero.

It is set again on S5 when latch 709 is reset to zero, which sets counter 703 to 0 (return to P0).

Latch L 701 is reset to zero on S3. On time S5, the counter set to 0 prevents this latch from being set again.

On the other hand, latch 700 is set again, which starts scanning of a new interface.

Latches 700 and 701 are of the master-slave type and therefore, they can be started in the same time.

The master latches are actuated by clock CK and the slave latches are actuated by clock CJ.

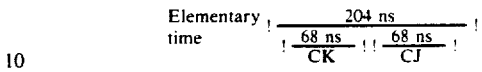

A jump command issued from control logic 708 allows counter CTR 703 to go directly from phase 1 to phase 3 and to jump phase 2. This is the case when the "service character" bit is not present in field SCF, which means that there is no character request coming from device 300, and makes the status information write phase unecessary.

On FIG. 15, signals EM1 and REC are the ones provided by address counter 502.

The fields of memory A relative to the interface being scanned, are shown on FIG. 15 and written by wire 320 and read by wire 318.

| Start phase: |
|---|
| CTR 703 = 0  Phase P0 and Start Bit = 1 |

This phase is executed when counter 703 is set to 0 and when latch 700 is set. During this phase, on time S0, field SCF of memory A is read and loaded into register 712 through AND gate 713 set by S0, P0 and output ST of start latch 700, field NPDF of the same memory is written into register 714, through AND gate 715.

On time S1, field SCF is re-written by erasing it in order not to do again the same operations for the same interface, through control logic 708 and AND gate 716 set by S1, P0 and ST.

On time S2, one reads the address of the control memory area assigned to the interface of the line being scanned, field SA. This address is loaded into register 717 through AND gate 718. On time S5, one reads field SPDF which is loaded into register 719 through AND gate 720.

| Data Management phase: |
|---|
| CTR 703 = 1 (Phase P1) and ENVELOPE = 1 (Output L 701: E = 1) |

During this phase, one reads on time S0, the field of memory A containing control parameters PARAM. On time S1, one re-writes this field through AND gate 721, the control logic having executed the following operations:
    Erasing the start bit whenever it is present,
    Modifying indicator bit PDF in order to count the number of characters being processed,
    Writing the Modem status change bit if this bit has been read in field SCF.

If indicator PDF has been found at 0, it will be re-written to 1. This case means, in transmit mode, that field SPDF contains a character to be given to device 300. In receive mode, this means that device 300 has given only one character which is located in field NPDF and will be transferred into field SPDF on the next phase. If indicator PDF has been found at 1, it will be re-written to 0. This case means, in transmit mode, that the character of field SPDF has been already sent to device 300. Then, a cycle steal process is initiated in order to acquire two new characters.

In receive mode, this means that device 300 has given two characters, on in field SPDF and the other one in field NPDF.

A cycle steal process is initiated in order to transfer these two characters to the microprocessor.

The contents of address register 717 is sent on address bus 17 through AND gate 722 set by cycle steal signal CS. Data bus 16 is connected to the input of register 723, 724 in transmit mode, through AND gate 725 set by cycle steal signal CS, signal P1 and signal XMIT indicating an operation in transmit mode. In receive mode, it is connected to the output of registers 714 and 719 through AND gate 726 set by signal CS, signal P1 and signal REC indicating an operation in receive mode.

| Status, information management phase |
| --- |
| counter CTR 703 = 2 (Phase P2) and ENVELOPE = 1 |

This phase is performed only when the control logic detects the "service character" bit in field SCF contained in register 712. This bit means that device 300 requests a new character in transmit mode or has placed a new character into field NPDF in receive mode.

In receive mode, on time S0, field NPDF in register 714, is re-written into field SPDF through AND gate 727 set by S0, P2 and signal REC (Receive Mode).

In transmit mode, the data to be transmitted which are in register 724, are written into field SPDF through AND gate 728 set by S0, P2, XMIT.

In receive mode, on time S1, a byte comprising only zeroes, is written into field PDF of memory B of device 300 by control logic 708 and AND gate 729.

In transmit mode, on time S1, the character received in register 723 is written into field PDF of memory B through AND gate 730 set by signals XMIT, S1, P2.

For both interfaces, on time S2, the address contained in register 717 is incremented through increment device INC 731 and AND gate 732 set by S2 and P2. +1 is added each time an half-word is transfered.

On same time S2, control logic 708 writes the status information to be sent to the microprocessor from the information found in field SCF, into register 734 through AND gate 735 set by S2 and P2.

Control logic 708 compares the last two bits of the address with bits 5 and 6 of half word PARAM (burst length). Bit 7 of this half word is compared with indicator bit PDF. This comparison indicates whether the storage area in the microprocessor memory assigned to the interface, has been filled in receive mode or emptied in transmit mode.

In this case, it is necessary to write a status information into the microprocessor memory. The address into which this operation is to be performed, is obtained from the address contained in register 717 by a single shift in shift register 736 under the control of control logic 708.

Control logic 708 initiates a cycle steal process and sends the contents of register 734 towards the data bus through AND gate 737 set by signals CS, P2 and the output of register 717 shifted by circuit 736 towards the address bus.

A status information will be also written before the end of a storage area in the following conditions:

| |
| --- |
| In receive mode, a combination of end bits E1, E2, E3 is found in field SCF or modem status change bit MC is found in the SCF. In transmit mode, bit MC is found in field SCF. Parameter management phase: |
| Counter CTR 703 = 3 (Phase 3) and ENVELOPE = 1 |

On time S0, one reads the interrupt request byte INT-.REQ containing the errors which have appeared on this interface.

This reading is performed through AND gate 738 set by S0, P3. If one of the bits indicates an error, control logic 708 initiates the interrupt process by sending the "loading Error Register" information to the address select device through wire 352.

On time S1, the information contained in the INT REQ byte is written into external register 8-6 through wrire 334 and in the same time, re-written into the INT REQ byte through AND gate 739 set by S1 and P3.

If external register 8-6 is free, the INT REQ byte is re-written as it is. If this register is already occupied by an interrupt issued from another interface, said interrupt being not yet processed by the microprocessor, the address select device sends the "STACK BUSY" information to device 301. At this time, the INT REQ field is not sent to the external error register and the "Interrupt pending" bit is set to 1 in this field.

| INT REQ FIELD FORMAT: | |
| --- | --- |
| Receive | |
| If Bit 8: 0 normal interrupt | If Bit 8: 1 interrupt due to an error |
| Bit 9: 1 overrun | Bit 9: 1 error due to LIC |
| Bit 11 = Modem change | Bit 11: 1 error due to the scan device |
| | Bit 12: 1 error on interface buses 16, 17 |
| Bit 13 Interrupt pending | |
| Transmit | |
| If Bit 8: 0 normal interrupt | If Bit 8: 1 interrupt due to an error |
| Bit 9: 1 underrun | Bit 9: 1 error due to LIC |
| Bit 10: 1 time elapsed | Bit 10: 1 DRC check drive circuit |
| Bit 11: 1 modem status change | Bit 11: 1 error on interface buses 16, 17 |
| Bit 13: interrupt pending | |

During the next scan, this bit will initiate again an interrupt process until the external error register is free.

Then, the control logic can initiate a cycle steal process in order to acquire a new parameter. The conditions are the same as for the status information. Each time a status information is written, a new parameter should be read. This parameter will be stored into register 741 issued from the microprocessor, line 16, through AND gate 740 set by signal CS (cycle steal and P3).

| Parameter re-write phase: |
| --- |
| counter CTR 703 = 0 and ENVELOPE = 1 |

On time S0, the contents of register 741 is written into half-word PARAM through AND gate 742. In receive mode, time counter field CTR TPS will be read and written into register 743 through AND gate 745 set by signals REC, S0, E, P0. The control logic increments it on time S2 through AND gate 746 set by signals E, P0, S2, REC. Field CTR TPS has the following format:

| Half-word 4 | Bit 8: | Work |
|---|---|---|
| | 9: | Mode |
| | 10: | Service |
| | 11 to 15: | Counting |

The incrementation is performed in accordance with the clock indicated by the "Mode" bit.

If this bit is set to 0, the time counter is incremented each time the 100 ms clock of the controller goes to 1, if this bit is 1, one takes the 2 ms clock.

The "work" bit is used to indicate that the setting to 1 of the clock has already incremented the time counter. It will be reset to zero when the clock goes to 0.

The time counter is used by the microcode which loads into the "counting" part, bits 11 to 15, the complementary value on the desired time and the incrementation is performed up to the 11111 value. The contents of register 743 is retained during the scanning of the next interface which is always the transmit interface of the same line. When processing the interrupt request field of this interface, if the value of bits 11 to 15 of register 743 is 11111, the "time out" information is written into the "interrupt request" field and external register 8-6. The microcode will be informed that the requested time is elapsed.

Read R and write W controls of memories A, B and C are shown in the following tables. As to memory A, the controls have been reported on appropriate times in the time diagram of FIG. 8.

These commands are generated by device 503 for initiating the read and write operations R/W of memories A, B, C in the locations selected by multiplex circuit 505.

| | | CONTROL OF MEMORY A | | | | | |
|---|---|---|---|---|---|---|---|
| Phase | S0 | S1 | S2 | S3 | S4 | S5 | S6 |
| Phase P0 Start Latch set | R1 SCF+NPDF (HW1 B0, B1) | W1 (HW1) Reset Service Character | R3 SA (HW3) B0, B1) | | | R2 SPDF (HW2 B0) | |
| Phase P1 | R4 paramet. (HW4 B0, B1) | | W4 paramet. (HW4 B0, B1) | | | | |
| | | DATA CYCLE STEAL | | | | | |
| Phase P2 | W2 PDF NPDF T SPDF (HW1 B0) | WB WR.MEM B PDF+SCF at 300 in XMIT → PCF at 300 in REC | W3 updating (HW3 B0, B1) | | | | |
| | | STATUS INFORMATION CYCLE STEAL | | | | | |
| Phase P3 | R2 read (HW2 B1) | W2 control Interrupt. | | | | | |
| | | PARAMETER CYCLE STEAL | | | | | |
| Phase P0 Start latch at zero | R E C | R4 read (HW4 B1) | W4 or W param. Update CTR.TPS and/or write PARAM. | | | | |
| | E M I | WP Write param. received in cycle steal 2 bytes | R'4 read (HW4 B1) | W'4 Update (HW4 B1) | | | |
| | | CONTROL OF MEMORIES B AND C RECEIVE INTERFACE | | | | | |
| SYNCHRONOUS WORK OF DEVICE 300 | | | | | | | |
| MEMORY B | Read | PCF (HW2 B1) | | SCF (HW1 B1 | SDF−SCF or PDF−PCF or SYNCHR. (HW1,2 | | |

-continued

| | | | | | | | |
|---|---|---|---|---|---|---|---|
| | Write | | from device 301 PCF (HW2 B1) | or 4 B0, B1) | SDF−SCF or PDF−PCF (HW1,2 B0, B1) | | |
| MEMORY C | Read | CRC (HW2 B0, B1) | MODEM IN (HW3 B0, B1) | INITIATE and (HW1 B0, B1) | | | |
| | Write | | | | MODEM IN (HW3 B0) | INITIATE and CONTR. HW1 B0, B1) | CRC (HW2 B0, B1) |

| TRANSMIT interface | | | | | | | |
|---|---|---|---|---|---|---|---|
| MEMORY B | Read | SDF SCF Half-word HW1 B0, B1 | | PDF PCF HW2 B0, B1 | SDF HW1 or DLE HW3 or SYN HW4 (B0) | | |
| | Write | | From device 301 PDF PCF HW2 B0, B1 | PCF HW2 B1 | SDF SCF HW1 B0, B1 | | SCF if under-run EOT HW1 B1 |
| MEMORY C | Read | CRC HW2 B0, B1 | MODEM OUT HW3 or 4 B0, B1 | INITIATE HW1 B0, B1 | | | |
| | Write | | | | MODEM OUT HW3 B0 . | INITIATE and CONTR HW1 B0, B1 | CRC HW2 B0, B1 |

= half-word
B = byte

We claim:

1. A line scanning device (7) working under control of a microprocessor (1) connected to a control memory (2) in which a storage location area is assigned to each line, said scanning device and the microprocessor being included in a line adapter (LA) provided for a communication controller (CC) which receives or sends message bits in series from or to terminals (T) connected to the lines, characterized in that it includes:

an addressable first storing means (306) in which a storage location area is assigned to each line, an addressable second storing means (314) in which a storage location area is assigned to each line, a control and address means (303) comprising first and second address counters (501 and 502) under the control of an elementary time counter, the first counter outputting during elementary time t of a line scanning, the line address information of the first storing means and the second counter outputting during a time equal to elementary time n+, with n equal to 4 or above, the address information of the second storing means, and control means (500, 503, 505) receiving said address information and the elementary time information to provide on outputs (324, 352) of the control and address means, read/write control and address information on times selected during the scanning period and, sequentially, the addresses of the lines being scanned, a first processing and monitoring logic circuit (308) comprising means (617, 614) for deserializing/serializing bits, for receiving or sending a message bit on each scanning period, this circuit being connected on the one hand, to a bit exchange line which carries the bit received or to be transmitted to the scanned line (348) and during the other hand, to the first storing means through a first read bus (310) and a first write bus (312) and to the second storing means through a second write bus (322) so that the information in the address storage location area can be read, processed and re-written, modified or not, in the first or second storing means in response to the bit received or to be sent, a second processing and monitoring logic circuit (316) comprising means (723, 724, 714, 719, 726, 725) for assembling characters into half-words and disassembling half-words into characters, connected on the one hand, to the control memory on an address bus (17) and a data bus (16) and on the other hand, to the second storing means on a read bus (318) and a write bus (320) and to the first storing means on a second write bus (322) in order to exchange the messages to be transmitted in cycle steal mode between the control memory and the addressed areas of the first and second storing means.

2. A device as set forth in claim 1 characterized in that the first storing means include:

a first memory in which a location area is assigned to each line in order to store at least one character received after it has been serialized by the first logic circuit and at least, one character to be transmitted before it being serialized, as well as transmission and synchronization control information (SCF, PCF), and a second memory in which a location area is assigned to each line for storing line and character service information, control information (MOD IN, MOD OUT) and set mode parameters of the line, both memories being able to be read and written in the same time.

3. A device as set forth in claim 1 or 2 characterized in that the second storing means comprise a memory in which each area assigned to a line contains the message characters to be exchanged with the control memory of the microprocessor, transmission managing information (SCF), transmission control parameters and the information relating to the addresses (SA) of the microprocessor control memory area assigned to the line.

4. A device as set forth in any one of claims 2 or 3 characterized in that the control and address means include a plurality of registers (8) which are used as registers external to the microprocessor, a first register being a line address register the contents of which is applied to the control means of the control and addressing means so that the microprocessor can communicate in asynchronous mode with the scanning device.

5. A device according to claim 4 characterized in that:
the first register is loaded with the address of a line,
a second register is loaded by the microprocessor in asynchronous mode, with the set mode parameters characterizing the line the address of which is loaded in the first register in order to load the set mode parameter characterizing the corresponding line in sequence into each area of the second memory of the first storing device.

6. A device as set forth in claim 5 characterized in that each area of the memory of the second storing means comprises a location provided for storing interrupt requests resulting for the detection of errors, and in that:
a third external register is an error register into which the error status can be loaded in asynchronous mode in order to be reported to the microprocessor.

7. A device as set forth in any one of the above claims, characterized in that:
each line comprises a receive interface and a transmit interface, the scanning of a line starting with the scanning of the receive interface followed by the scanning of the transmit interface, the storage location areas including locations assigned to the receive interfaces and locations assigned to the transmit interfaces.

8. A device as set forth in claim 7, characterized in that the second processing and monitoring logic circuit comprises means for dividing time nt into five periods of work including:
a phase counter (703) providing at its four outputs, time-shifted pulses covering period nt,
a start latch (700) which is set when said second logic circuit is ready to work on a new interface, when the pulse on the first output of said phase counter is set to 1 and the preceding scan period is terminated and which provides on its output (352) a start pulse.

9. A device as set forth in claim 8, characterized in that the control means of the control and addressing means comprise:
an elementary time counter (500) generating on its output (512), elementary time pulses (S0 to S6) covering the scanning period,
multiplexing means (505) receiving address information from the first and second counters, and from the first external register and the elementary time pulses for outputting the address of the memories of the first storage means and of the memory of the second storage means at selected instants,
read/write control means (503) which receives the elementary pulses and the start pulse generated by the second processing and monitoring logic circuit in order to provide the read and write controls at selected instants for executing the operations required for processing the messages.

10. A device as set forth in any one of the claims 7, 8 or 9 characterized in that the first processing and monitoring logic circuit comprises:
means for searching the timing characters of the received messages, including:
a shift register (602) in which the bits received are stored at the beginning of each receive interface scanning period, the contents of said shift register being re-written into the second memory of the first storing means at the end of the scanning into a location which is read during the next scanning period and stored into said register,
a comparator (613) for comparing during each scanning period, the contents of the shift register and the timing information in the area of the first memory of the first storing means, and
means (643, 614) for detecting an equality at the comparator output in order to write a bit indicating that the timing has been found into the location of the first memory of the first storing means containing the transmission control information.

11. A device as set forth in claim 9 or 10 characterized in that it comprises:
means for managing control wires of modems arranged between the terminals connected to the scanned line and the scanning device, including a comparator to compare the signal pattern on the control wires and the control information in the second memory of the first storing device and a latch (616) connected to the output of the comparator in order to store the modem wire status change information which will be written into the first memory of the first storing means.

* * * * *